(12) United States Patent
Cheyer

(10) Patent No.: US 10,002,189 B2
(45) Date of Patent: Jun. 19, 2018

(54) METHOD AND APPARATUS FOR SEARCHING USING AN ACTIVE ONTOLOGY

(75) Inventor: Adam Cheyer, Oakland, CA (US)

(73) Assignee: Apple Inc., Cupertino, CA (US)

( * ) Notice: Subject to any disclaimer, the term of this patent is extended or adjusted under 35 U.S.C. 154(b) by 294 days.

(21) Appl. No.: 12/341,743

(22) Filed: Dec. 22, 2008

(65) Prior Publication Data

US 2009/0164441 A1 Jun. 25, 2009

Related U.S. Application Data

(60) Provisional application No. 61/015,495, filed on Dec. 20, 2007.

(51) Int. Cl.
*G06F 17/30* (2006.01)

(52) U.S. Cl.
CPC .. *G06F 17/30734* (2013.01); *G06F 17/30663* (2013.01); *G06F 17/30675* (2013.01)

(58) Field of Classification Search
CPC ................................................ G06F 17/30663
USPC ........................ 707/705, 706–708, 758, 759
See application file for complete search history.

(56) References Cited

U.S. PATENT DOCUMENTS

| 3,704,345 A | 11/1972 | Coker et al. |
|---|---|---|
| 3,828,132 A | 8/1974 | Flanagan et al. |
| 3,979,557 A | 9/1976 | Schulman et al. |
| 4,278,838 A | 7/1981 | Antonov |
| 4,282,405 A | 8/1981 | Taguchi |
| 4,310,721 A | 1/1982 | Manley et al. |
| 4,348,553 A | 9/1982 | Baker et al. |
| 4,653,021 A | 3/1987 | Takagi |
| 4,688,195 A | 8/1987 | Thompson et al. |
| 4,692,941 A | 9/1987 | Jacks et al. |
| 4,718,094 A | 1/1988 | Bahl et al. |
| 4,724,542 A | 2/1988 | Williford |
| 4,726,065 A | 2/1988 | Froessl |
| 4,727,354 A | 2/1988 | Lindsay |
| 4,776,016 A | 10/1988 | Hansen |
| 4,783,807 A | 11/1988 | Marley |
| 4,811,243 A | 3/1989 | Racine |

(Continued)

FOREIGN PATENT DOCUMENTS

| DE | 3837590 A1 | 5/1990 |
|---|---|---|
| DE | 198 41 541 B4 | 12/2007 |

(Continued)

OTHER PUBLICATIONS

Sheth et al., "Relationships at the Heart of Semantic Web: Modeling, Discovering, and Exploiting Complex Semantic Relationships," Oct. 13, 2002.*

(Continued)

*Primary Examiner* — Grace A Park
(74) *Attorney, Agent, or Firm* — Dentons US LLP

(57) ABSTRACT

Embodiments of the present invention provide a method and apparatus for searching using an active ontology. One embodiment of a method for searching a database includes receiving a search string, where the search string comprises one or more words, generating a semantic representation of the search string in accordance with an ontology, searching the database using the semantic representation, and outputting a result of the searching.

71 Claims, 3 Drawing Sheets

(56) References Cited

U.S. PATENT DOCUMENTS

| | | |
|---|---|---|
| 4,819,271 A | 4/1989 | Bahl et al. |
| 4,827,520 A | 5/1989 | Zeinstra |
| 4,829,576 A | 5/1989 | Porter |
| 4,833,712 A | 5/1989 | Bahl et al. |
| 4,839,853 A | 6/1989 | Deerwester et al. |
| 4,852,168 A | 7/1989 | Sprague |
| 4,862,504 A | 8/1989 | Nomura |
| 4,878,230 A | 10/1989 | Murakami et al. |
| 4,903,305 A | 2/1990 | Gillick et al. |
| 4,905,163 A | 2/1990 | Garber et al. |
| 4,914,586 A | 4/1990 | Swinehart et al. |
| 4,944,013 A | 7/1990 | Gouvianakis et al. |
| 4,965,763 A | 10/1990 | Zamora |
| 4,974,191 A | 11/1990 | Amirghodsi et al. |
| 4,977,598 A | 12/1990 | Doddington et al. |
| 4,992,972 A | 2/1991 | Brooks et al. |
| 5,010,574 A | 4/1991 | Wang |
| 5,020,112 A | 5/1991 | Chou |
| 5,021,971 A | 6/1991 | Lindsay |
| 5,022,081 A | 6/1991 | Hirose et al. |
| 5,027,406 A | 6/1991 | Roberts et al. |
| 5,031,217 A | 7/1991 | Nishimura |
| 5,032,989 A | 7/1991 | Tornetta |
| 5,040,218 A | 8/1991 | Vitale et al. |
| 5,072,452 A | 12/1991 | Brown et al. |
| 5,091,945 A | 2/1992 | Kleijn |
| 5,127,053 A | 6/1992 | Koch |
| 5,127,055 A | 6/1992 | Larkey |
| 5,128,672 A | 7/1992 | Kaehler |
| 5,133,011 A | 7/1992 | McKiel, Jr. |
| 5,142,584 A | 8/1992 | Ozawa |
| 5,164,900 A | 11/1992 | Bernath |
| 5,165,007 A | 11/1992 | Bahl et al. |
| 5,179,652 A | 1/1993 | Rozmanith et al. |
| 5,194,950 A | 3/1993 | Murakami et al. |
| 5,199,077 A | 3/1993 | Wilcox et al. |
| 5,202,952 A | 4/1993 | Gillick et al. |
| 5,208,862 A | 5/1993 | Ozawa |
| 5,216,747 A | 6/1993 | Hardwick et al. |
| 5,220,639 A | 6/1993 | Lee |
| 5,220,657 A | 6/1993 | Bly et al. |
| 5,222,146 A | 6/1993 | Bahl et al. |
| 5,230,036 A | 7/1993 | Akamine et al. |
| 5,235,680 A | 8/1993 | Bijnagte |
| 5,267,345 A | 11/1993 | Brown et al. |
| 5,268,990 A | 12/1993 | Cohen et al. |
| 5,282,265 A | 1/1994 | Rohra Suda et al. |
| RE34,562 E | 3/1994 | Murakami et al. |
| 5,291,286 A | 3/1994 | Murakami et al. |
| 5,293,448 A | 3/1994 | Honda |
| 5,293,452 A | 3/1994 | Picone et al. |
| 5,297,170 A | 3/1994 | Eyuboglu et al. |
| 5,301,109 A | 4/1994 | Landauer et al. |
| 5,303,406 A | 4/1994 | Hansen et al. |
| 5,317,507 A | 5/1994 | Gallant |
| 5,317,647 A | 5/1994 | Pagallo |
| 5,325,297 A | 6/1994 | Bird et al. |
| 5,325,298 A | 6/1994 | Gallant |
| 5,327,498 A | 7/1994 | Hamon |
| 5,333,236 A | 7/1994 | Bahl et al. |
| 5,333,275 A | 7/1994 | Wheatley et al. |
| 5,345,536 A | 9/1994 | Hoshimi et al. |
| 5,349,645 A | 9/1994 | Zhao |
| 5,353,377 A | 10/1994 | Kuroda et al. |
| 5,377,301 A | 12/1994 | Rosenberg et al. |
| 5,377,303 A | 12/1994 | Firman |
| 5,384,892 A | 1/1995 | Strong |
| 5,384,893 A | 1/1995 | Hutchins |
| 5,386,494 A | 1/1995 | White |
| 5,386,556 A | 1/1995 | Hedin et al. |
| 5,390,279 A | 2/1995 | Strong |
| 5,396,625 A | 3/1995 | Parkes |
| 5,400,434 A | 3/1995 | Pearson |
| 5,424,947 A | 6/1995 | Nagao et al. |
| 5,434,777 A | 7/1995 | Luciw |
| 5,455,888 A | 10/1995 | Lyengar et al. |
| 5,469,529 A | 11/1995 | Bimbot et al. |
| 5,475,587 A | 12/1995 | Anick et al. |
| 5,479,488 A | 12/1995 | Lenning et al. |
| 5,491,772 A | 2/1996 | Hardwick et al. |
| 5,502,790 A | 3/1996 | Yi |
| 5,502,791 A | 3/1996 | Nishimura et al. |
| 5,515,475 A | 5/1996 | Gupta et al. |
| 5,536,902 A | 7/1996 | Serra et al. |
| 5,574,823 A | 11/1996 | Hassanein et al. |
| 5,577,164 A | 11/1996 | Kaneko et al. |
| 5,577,241 A | 11/1996 | Spencer |
| 5,579,436 A | 11/1996 | Chou et al. |
| 5,581,655 A | 12/1996 | Cohen et al. |
| 5,596,676 A | 1/1997 | Swaminathan et al. |
| 5,608,624 A | 3/1997 | Luciw |
| 5,613,036 A | 3/1997 | Strong |
| 5,617,507 A | 4/1997 | Lee et al. |
| 5,621,859 A | 4/1997 | Schwartz et al. |
| 5,642,464 A | 6/1997 | Yue et al. |
| 5,642,519 A | 6/1997 | Martin |
| 5,664,055 A | 9/1997 | Kroon |
| 5,675,819 A | 10/1997 | Schuetze |
| 5,682,539 A | 10/1997 | Conrad et al. |
| 5,687,077 A | 11/1997 | Gough, Jr. |
| 5,712,957 A | 1/1998 | Waibel et al. |
| 5,727,950 A | 3/1998 | Cook et al. |
| 5,729,694 A | 3/1998 | Holzrichter et al. |
| 5,732,390 A | 3/1998 | Katayanagi et al. |
| 5,734,791 A | 3/1998 | Acero et al. |
| 5,748,974 A | 5/1998 | Johnson |
| 5,777,614 A | 7/1998 | Ando et al. |
| 5,790,978 A | 8/1998 | Olive et al. |
| 5,794,050 A | 8/1998 | Dahlgren et al. |
| 5,794,182 A | 8/1998 | Manduchi et al. |
| 5,799,276 A | 8/1998 | Komissarchik et al. |
| 5,826,261 A | 10/1998 | Spencer |
| 5,828,999 A | 10/1998 | Bellegarda et al. |
| 5,835,893 A | 11/1998 | Ushioda |
| 5,839,106 A | 11/1998 | Bellegarda |
| 5,860,063 A | 1/1999 | Gorin et al. |
| 5,864,806 A | 1/1999 | Mokbel et al. |
| 5,867,799 A | 2/1999 | Lang et al. |
| 5,873,056 A | 2/1999 | Liddy et al. |
| 5,895,466 A | 4/1999 | Goldberg et al. |
| 5,899,972 A | 5/1999 | Miyazawa et al. |
| 5,913,193 A | 6/1999 | Huang et al. |
| 5,915,249 A | 6/1999 | Spencer |
| 5,943,670 A | 8/1999 | Prager |
| 5,987,404 A | 11/1999 | Della Pietra et al. |
| 6,016,471 A | 1/2000 | Kuhn et al. |
| 6,029,132 A | 2/2000 | Kuhn et al. |
| 6,038,533 A | 3/2000 | Buchsbaum et al. |
| 6,052,656 A | 4/2000 | Suda et al. |
| 6,064,960 A | 5/2000 | Bellegarda et al. |
| 6,081,750 A | 6/2000 | Hoffberg et al. |
| 6,088,671 A | 7/2000 | Gould et al. |
| 6,088,731 A | 7/2000 | Kiraly et al. |
| 6,108,627 A | 8/2000 | Sabourin |
| 6,122,616 A | 9/2000 | Henton |
| 6,144,938 A | 11/2000 | Surace et al. |
| 6,161,084 A * | 12/2000 | Messerly et al. ............... 704/9 |
| 6,173,261 B1 | 1/2001 | Arai et al. |
| 6,188,999 B1 | 2/2001 | Moody |
| 6,195,641 B1 | 2/2001 | Loring et al. |
| 6,208,971 B1 | 3/2001 | Bellegarda et al. |
| 6,233,559 B1 | 5/2001 | Balakrishnan |
| 6,246,981 B1 | 6/2001 | Papineni et al. |
| 6,266,637 B1 | 7/2001 | Donovan et al. |
| 6,285,786 B1 | 9/2001 | Seni et al. |
| 6,308,149 B1 | 10/2001 | Gaussier et al. |
| 6,317,594 B1 | 11/2001 | Gossman et al. |
| 6,317,707 B1 | 11/2001 | Bangalore et al. |
| 6,317,831 B1 | 11/2001 | King |
| 6,321,092 B1 | 11/2001 | Fitch et al. |
| 6,334,103 B1 | 12/2001 | Surace et al. |
| 6,356,854 B1 | 3/2002 | Schubert et al. |
| 6,366,883 B1 | 4/2002 | Campbell et al. |
| 6,366,884 B1 | 4/2002 | Beillegarda et al. |

(56) References Cited

U.S. PATENT DOCUMENTS

| | | | |
|---|---|---|---|
| 6,421,672 | B1 | 7/2002 | McAllister et al. |
| 6,434,524 | B1 | 8/2002 | Weber |
| 6,446,076 | B1 | 9/2002 | Burkey et al. |
| 6,453,292 | B2 | 9/2002 | Ramaswamy et al. |
| 6,466,654 | B1 | 10/2002 | Cooper et al. |
| 6,477,488 | B1 | 11/2002 | Bellegarda |
| 6,487,534 | B1 | 11/2002 | Thelen et al. |
| 6,499,013 | B1 | 12/2002 | Weber |
| 6,501,937 | B1 | 12/2002 | Ho et al. |
| 6,505,158 | B1 | 1/2003 | Conkie |
| 6,513,063 | B1 | 1/2003 | Julia et al. |
| 6,523,061 | B1 | 2/2003 | Halverson et al. |
| 6,526,395 | B1 | 2/2003 | Morris |
| 6,532,444 | B1 | 3/2003 | Weber |
| 6,532,446 | B1 | 3/2003 | King |
| 6,553,344 | B2 | 4/2003 | Bellegarda et al. |
| 6,598,039 | B1 | 7/2003 | Livowsky |
| 6,601,026 | B2 | 7/2003 | Appelt et al. |
| 6,604,059 | B2 | 8/2003 | Strubbe et al. |
| 6,615,172 | B1 | 9/2003 | Bennett et al. |
| 6,615,175 | B1 | 9/2003 | Gazdzinski |
| 6,631,346 | B1 | 10/2003 | Karaorman et al. |
| 6,633,846 | B1 | 10/2003 | Bennett et al. |
| 6,647,260 | B2 | 11/2003 | Dusse et al. |
| 6,650,735 | B2 | 11/2003 | Burton et al. |
| 6,654,740 | B2 | 11/2003 | Tokuda et al. |
| 6,665,639 | B2 | 12/2003 | Mozer et al. |
| 6,665,640 | B1 | 12/2003 | Bennett et al. |
| 6,665,641 | B1 | 12/2003 | Coorman et al. |
| 6,684,187 | B1 | 1/2004 | Conkie |
| 6,691,111 | B2 | 2/2004 | Lazaridis et al. |
| 6,691,151 | B1 | 2/2004 | Cheyer et al. |
| 6,697,780 | B1 | 2/2004 | Beutnagel et al. |
| 6,735,632 | B1 | 5/2004 | Kiraly et al. |
| 6,742,021 | B1 | 5/2004 | Halverson et al. |
| 6,757,362 | B1 | 6/2004 | Cooper et al. |
| 6,757,718 | B1 | 6/2004 | Halverson et al. |
| 6,778,951 | B1 | 8/2004 | Contractor |
| 6,778,952 | B2 | 8/2004 | Bellegarda |
| 6,778,962 | B1 | 8/2004 | Kasai et al. |
| 6,792,082 | B1 | 9/2004 | Levine |
| 6,807,574 | B1 | 10/2004 | Partovi et al. |
| 6,810,379 | B1 | 10/2004 | Vermeulen et al. |
| 6,813,491 | B1 | 11/2004 | McKinney |
| 6,832,194 | B1 | 12/2004 | Mozer et al. |
| 6,842,767 | B1 | 1/2005 | Partovi et al. |
| 6,847,966 | B1 | 1/2005 | Sommer et al. |
| 6,851,115 | B1 | 2/2005 | Cheyer et al. |
| 6,859,931 | B1 | 2/2005 | Cheyer et al. |
| 6,895,380 | B2 | 5/2005 | Sepe, Jr. |
| 6,895,558 | B1 | 5/2005 | Loveland |
| 6,912,499 | B1 | 6/2005 | Sabourin et al. |
| 6,928,614 | B1 | 8/2005 | Everhart |
| 6,937,975 | B1 | 8/2005 | Elworthy |
| 6,937,986 | B2 | 8/2005 | Denenberg et al. |
| 6,964,023 | B2 | 11/2005 | Maes et al. |
| 6,980,949 | B2 | 12/2005 | Ford |
| 6,980,955 | B2 | 12/2005 | Okutani et al. |
| 6,985,865 | B1 | 1/2006 | Packingham et al. |
| 6,988,071 | B1 | 1/2006 | Gazdzinski |
| 6,996,531 | B2 | 2/2006 | Korall et al. |
| 6,999,927 | B2 | 2/2006 | Mozer et al. |
| 7,020,685 | B1 | 3/2006 | Chen et al. |
| 7,027,974 | B1 | 4/2006 | Busch et al. |
| 7,036,128 | B1 | 4/2006 | Julia et al. |
| 7,050,977 | B1 | 5/2006 | Bennett |
| 7,058,569 | B2 | 6/2006 | Coorman et al. |
| 7,062,428 | B2 | 6/2006 | Hogenhout et al. |
| 7,069,560 | B1 | 6/2006 | Cheyer et al. |
| 7,092,887 | B2 | 8/2006 | Mozer et al. |
| 7,092,928 | B1 | 8/2006 | Elad et al. |
| 7,093,693 | B1 | 8/2006 | Gazdzinski |
| 7,127,046 | B1 | 10/2006 | Smith et al. |
| 7,136,710 | B1 | 11/2006 | Hoffberg et al. |
| 7,137,126 | B1 | 11/2006 | Coffman et al. |
| 7,139,714 | B2 | 11/2006 | Bennett et al. |
| 7,139,722 | B2 | 11/2006 | Perrella et al. |
| 7,177,798 | B2 | 2/2007 | Hsu et al. |
| 7,197,460 | B1 | 3/2007 | Gupta et al. |
| 7,200,559 | B2 | 4/2007 | Wang |
| 7,203,646 | B2 | 4/2007 | Bennett |
| 7,216,073 | B2 | 5/2007 | Lavi et al. |
| 7,216,080 | B2 | 5/2007 | Tsiao et al. |
| 7,225,125 | B2 | 5/2007 | Bennett et al. |
| 7,233,790 | B2 | 6/2007 | Kjellberg et al. |
| 7,233,904 | B2 | 6/2007 | Luisi |
| 7,266,496 | B2 | 9/2007 | Wang et al. |
| 7,277,854 | B2 | 10/2007 | Bennett et al. |
| 7,290,039 | B1 | 10/2007 | Lisitsa et al. |
| 7,292,579 | B2 | 11/2007 | Morris |
| 7,299,033 | B2 | 11/2007 | Kjellberg et al. |
| 7,310,600 | B1 | 12/2007 | Garner et al. |
| 7,324,947 | B2 | 1/2008 | Jordan et al. |
| 7,349,953 | B2 | 3/2008 | Lisitsa et al. |
| 7,376,556 | B2 | 5/2008 | Bennett |
| 7,376,645 | B2 | 5/2008 | Bernard |
| 7,379,874 | B2 | 5/2008 | Schmid et al. |
| 7,386,449 | B2 | 6/2008 | Sun et al. |
| 7,392,185 | B2 | 6/2008 | Bennett |
| 7,398,209 | B2 | 7/2008 | Kennewick et al. |
| 7,403,938 | B2 | 7/2008 | Harrison et al. |
| 7,409,337 | B1 | 8/2008 | Potter et al. |
| 7,415,100 | B2 | 8/2008 | Cooper et al. |
| 7,418,392 | B1 | 8/2008 | Mozer et al. |
| 7,426,467 | B2 | 9/2008 | Nashida et al. |
| 7,427,024 | B1 | 9/2008 | Gazdzinski et al. |
| 7,447,635 | B1 | 11/2008 | Konopka et al. |
| 7,454,351 | B2 | 11/2008 | Jeschke et al. |
| 7,467,087 | B1 | 12/2008 | Gillick et al. |
| 7,475,010 | B2 | 1/2009 | Chao |
| 7,483,894 | B2 | 1/2009 | Cao |
| 7,487,089 | B2 | 2/2009 | Mozer |
| 7,496,498 | B2 | 2/2009 | Chu et al. |
| 7,496,512 | B2 | 2/2009 | Zhao et al. |
| 7,502,738 | B2 | 3/2009 | Kennewick et al. |
| 7,508,373 | B2 | 3/2009 | Lin et al. |
| 7,522,927 | B2 | 4/2009 | Fitch et al. |
| 7,523,108 | B2 | 4/2009 | Cao |
| 7,526,466 | B2 | 4/2009 | Au |
| 7,529,671 | B2 | 5/2009 | Rockenbeck et al. |
| 7,529,676 | B2 | 5/2009 | Koyama |
| 7,539,656 | B2 | 5/2009 | Fratkina et al. |
| 7,543,232 | B2 | 6/2009 | Easton et al. |
| 7,546,382 | B2 | 6/2009 | Healey et al. |
| 7,548,895 | B2 | 6/2009 | Pulsipher |
| 7,555,431 | B2 | 6/2009 | Bennett |
| 7,571,106 | B2 | 8/2009 | Cao et al. |
| 7,599,918 | B2 | 10/2009 | Shen et al. |
| 7,620,549 | B2 | 11/2009 | Di Cristo et al. |
| 7,624,007 | B2 | 11/2009 | Bennett |
| 7,634,409 | B2 | 12/2009 | Kennewick et al. |
| 7,636,657 | B2 | 12/2009 | Ju et al. |
| 7,640,160 | B2 | 12/2009 | Di Cristo et al. |
| 7,647,225 | B2 | 1/2010 | Bennett et al. |
| 7,657,424 | B2 | 2/2010 | Bennett |
| 7,672,841 | B2 | 3/2010 | Bennett |
| 7,676,026 | B1 | 3/2010 | Baxter, Jr. |
| 7,684,985 | B2 | 3/2010 | Dominach et al. |
| 7,693,715 | B2 | 4/2010 | Hwang et al. |
| 7,693,720 | B2 | 4/2010 | Kennewick et al. |
| 7,698,131 | B2 | 4/2010 | Bennett |
| 7,702,500 | B2 | 4/2010 | Blaedow |
| 7,702,508 | B2 | 4/2010 | Bennett |
| 7,707,027 | B2 | 4/2010 | Balchandran et al. |
| 7,707,032 | B2 | 4/2010 | Wang et al. |
| 7,707,267 | B2 | 4/2010 | Lisitsa et al. |
| 7,711,565 | B1 | 5/2010 | Gazdzinski |
| 7,711,672 | B2 | 5/2010 | Au |
| 7,716,056 | B2 | 5/2010 | Weng et al. |
| 7,720,674 | B2 | 5/2010 | Kaiser et al. |
| 7,720,683 | B1 | 5/2010 | Vermeulen et al. |
| 7,725,307 | B2 | 5/2010 | Bennett |
| 7,725,318 | B2 | 5/2010 | Gavalda et al. |
| 7,725,320 | B2 | 5/2010 | Bennett |

(56) References Cited

U.S. PATENT DOCUMENTS

| | | |
|---|---|---|
| 7,725,321 B2 | 5/2010 | Bennett |
| 7,729,904 B2 | 6/2010 | Bennett |
| 7,729,916 B2 | 6/2010 | Coffman et al. |
| 7,734,461 B2 | 6/2010 | Kwak et al. |
| 7,752,152 B2 | 7/2010 | Peek et al. |
| 7,774,204 B2 | 8/2010 | Mozer et al. |
| 7,783,486 B2 | 8/2010 | Rosser et al. |
| 7,801,729 B2 | 9/2010 | Mozer |
| 7,809,570 B2 | 10/2010 | Kennewick et al. |
| 7,809,610 B2 | 10/2010 | Cao |
| 7,818,176 B2 | 10/2010 | Freeman et al. |
| 7,822,608 B2 | 10/2010 | Cross, Jr. et al. |
| 7,823,123 B2 | 10/2010 | Sabbouh |
| 7,826,945 B2 | 11/2010 | Zhang et al. |
| 7,831,426 B2 | 11/2010 | Bennett |
| 7,840,400 B2 | 11/2010 | Lavi et al. |
| 7,840,447 B2 | 11/2010 | Kleinrock et al. |
| 7,873,519 B2 | 1/2011 | Bennett |
| 7,873,654 B2 | 1/2011 | Bernard |
| 7,881,936 B2 | 2/2011 | Longé et al. |
| 7,912,702 B2 | 3/2011 | Bennett |
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,925,525 B2 | 4/2011 | Chin |
| 7,930,168 B2 | 4/2011 | Weng et al. |
| 7,949,529 B2 | 5/2011 | Weider et al. |
| 7,974,844 B2 | 7/2011 | Sumita |
| 7,974,972 B2 | 7/2011 | Cao |
| 7,983,915 B2 | 7/2011 | Knight et al. |
| 7,983,917 B2 | 7/2011 | Kennewick et al. |
| 7,983,997 B2 | 7/2011 | Allen et al. |
| 7,987,151 B2 | 7/2011 | Schott et al. |
| 8,000,453 B2 | 8/2011 | Cooper et al. |
| 8,005,679 B2 | 8/2011 | Jordan et al. |
| 8,015,006 B2 | 9/2011 | Kennewick et al. |
| 8,024,195 B2 | 9/2011 | Mozer et al. |
| 8,036,901 B2 | 10/2011 | Mozer |
| 8,041,570 B2 | 10/2011 | Mirkovic et al. |
| 8,041,611 B2 | 10/2011 | Kleinrock et al. |
| 8,055,708 B2 | 11/2011 | Chitsaz et al. |
| 8,065,155 B1 | 11/2011 | Gazdzinski |
| 8,065,156 B2 | 11/2011 | Gazdzinski |
| 8,069,046 B2 | 11/2011 | Kennewick et al. |
| 8,073,681 B2 | 12/2011 | Baldwin et al. |
| 8,078,473 B1 | 12/2011 | Gazdzinski |
| 8,082,153 B2 | 12/2011 | Coffman et al. |
| 8,095,364 B2 | 1/2012 | Longé et al. |
| 8,099,289 B2 | 1/2012 | Mozer et al. |
| 8,107,401 B2 | 1/2012 | John et al. |
| 8,112,275 B2 | 2/2012 | Kennewick et al. |
| 8,112,280 B2 | 2/2012 | Lu |
| 8,117,037 B2 | 2/2012 | Gazdzinski |
| 8,140,335 B2 | 3/2012 | Kennewick et al. |
| 8,165,886 B1 | 4/2012 | Gagnon et al. |
| 8,166,019 B1 | 4/2012 | Lee et al. |
| 8,190,359 B2 | 5/2012 | Bourne |
| 8,195,467 B2 | 6/2012 | Mozer et al. |
| 8,204,238 B2 | 6/2012 | Mozer |
| 8,205,788 B1 | 6/2012 | Gazdzinski et al. |
| 8,219,407 B1 | 7/2012 | Roy et al. |
| 8,285,551 B2 | 10/2012 | Gazdzinski |
| 8,285,553 B2 | 10/2012 | Gazdzinski |
| 8,290,778 B2 | 10/2012 | Gazdzinski |
| 8,290,781 B2 | 10/2012 | Gazdzinski |
| 8,296,146 B2 | 10/2012 | Gazdzinski |
| 8,296,153 B2 | 10/2012 | Gazdzinski |
| 8,301,456 B2 | 10/2012 | Gazdzinski |
| 8,311,834 B1 | 11/2012 | Gazdzinski |
| 8,370,158 B2 | 2/2013 | Gazdzinski |
| 8,371,503 B2 | 2/2013 | Gazdzinski |
| 8,447,612 B2 | 5/2013 | Gazdzinski |
| 2002/0032564 A1 | 3/2002 | Ehsani et al. |
| 2002/0046025 A1 | 4/2002 | Hain |
| 2002/0069063 A1 | 6/2002 | Buchner et al. |
| 2002/0077817 A1 | 6/2002 | Atal |
| 2003/0120494 A1 | 6/2003 | Jost et al. |
| 2003/0212961 A1 | 11/2003 | Soin et al. |
| 2004/0054535 A1 | 3/2004 | Mackie et al. |
| 2004/0054690 A1 | 3/2004 | Hillerbrand et al. |
| 2004/0135701 A1 | 7/2004 | Yasuda et al. |
| 2004/0162741 A1 | 8/2004 | Flaxer et al. |
| 2004/0193420 A1 | 9/2004 | Kennewick et al. |
| 2005/0071332 A1* | 3/2005 | Ortega et al. ............... 707/4 |
| 2005/0080625 A1 | 4/2005 | Bennett et al. |
| 2005/0119897 A1 | 6/2005 | Bennett et al. |
| 2005/0125235 A1 | 6/2005 | Lazay et al. |
| 2005/0143972 A1 | 6/2005 | Gopalakrishnan et al. |
| 2005/0182629 A1 | 8/2005 | Coorman et al. |
| 2005/0196733 A1 | 9/2005 | Budra et al. |
| 2006/0018492 A1 | 1/2006 | Chiu et al. |
| 2006/0111906 A1 | 5/2006 | Cross et al. |
| 2006/0122834 A1 | 6/2006 | Bennett |
| 2006/0143007 A1 | 6/2006 | Koh et al. |
| 2007/0050191 A1 | 3/2007 | Weider et al. |
| 2007/0055529 A1 | 3/2007 | Kanevsky et al. |
| 2007/0058832 A1 | 3/2007 | Hug et al. |
| 2007/0088556 A1 | 4/2007 | Andrew |
| 2007/0100790 A1 | 5/2007 | Cheyer et al. |
| 2007/0118377 A1 | 5/2007 | Badino et al. |
| 2007/0124149 A1 | 5/2007 | Shen et al. |
| 2007/0174188 A1 | 7/2007 | Fish |
| 2007/0185917 A1 | 8/2007 | Prahlad et al. |
| 2007/0208726 A1* | 9/2007 | Krishnaprasad et al. ...... 707/4 |
| 2007/0276810 A1* | 11/2007 | Rosen ............................ 707/3 |
| 2007/0282595 A1 | 12/2007 | Tunning et al. |
| 2008/0015864 A1 | 1/2008 | Ross et al. |
| 2008/0021708 A1 | 1/2008 | Bennett et al. |
| 2008/0034032 A1 | 2/2008 | Healey et al. |
| 2008/0052063 A1 | 2/2008 | Bennett et al. |
| 2008/0071544 A1 | 3/2008 | Beaufays et al. |
| 2008/0071742 A1* | 3/2008 | Yang ............... G06F 17/30864 |
| 2008/0120112 A1 | 5/2008 | Jordan et al. |
| 2008/0129520 A1 | 6/2008 | Lee |
| 2008/0140657 A1* | 6/2008 | Azvine et al. ................ 707/6 |
| 2008/0221880 A1 | 9/2008 | Cerra et al. |
| 2008/0221903 A1 | 9/2008 | Kanevsky et al. |
| 2008/0228496 A1 | 9/2008 | Yu et al. |
| 2008/0247519 A1 | 10/2008 | Abella et al. |
| 2008/0249770 A1 | 10/2008 | Kim et al. |
| 2008/0300878 A1 | 12/2008 | Bennett |
| 2009/0006100 A1 | 1/2009 | Badger et al. |
| 2009/0006343 A1 | 1/2009 | Platt et al. |
| 2009/0030800 A1 | 1/2009 | Grois |
| 2009/0058823 A1 | 3/2009 | Kocienda |
| 2009/0076796 A1 | 3/2009 | Daraselia |
| 2009/0100049 A1 | 4/2009 | Cao |
| 2009/0112572 A1 | 4/2009 | Thorn |
| 2009/0112677 A1 | 4/2009 | Rhett |
| 2009/0150156 A1 | 6/2009 | Kennewick et al. |
| 2009/0157382 A1* | 6/2009 | Bar ................................ 704/8 |
| 2009/0157401 A1 | 6/2009 | Bennett |
| 2009/0164441 A1 | 6/2009 | Cheyer |
| 2009/0171664 A1 | 7/2009 | Kennewick et al. |
| 2009/0253463 A1 | 10/2009 | Shin et al. |
| 2009/0290718 A1 | 11/2009 | Kahn et al. |
| 2009/0299745 A1 | 12/2009 | Kennewick et al. |
| 2009/0299849 A1 | 12/2009 | Cao et al. |
| 2009/0306980 A1 | 12/2009 | Shin |
| 2010/0005081 A1 | 1/2010 | Bennett |
| 2010/0023320 A1 | 1/2010 | Di Cristo et al. |
| 2010/0145700 A1 | 1/2010 | Kennewick et al. |
| 2010/0036660 A1 | 2/2010 | Bennett |
| 2010/0042400 A1 | 2/2010 | Block et al. |
| 2010/0088020 A1 | 4/2010 | Sano et al. |
| 2010/0204986 A1 | 8/2010 | Kennewick et al. |
| 2010/0217604 A1 | 8/2010 | Baldwin et al. |
| 2010/0228540 A1 | 9/2010 | Bennett |
| 2010/0235341 A1 | 9/2010 | Bennett |
| 2010/0257160 A1 | 10/2010 | Cao |
| 2010/0277579 A1 | 11/2010 | Cho et al. |
| 2010/0280983 A1 | 11/2010 | Cho et al. |
| 2010/0286985 A1 | 11/2010 | Kennewick et al. |
| 2010/0299142 A1 | 11/2010 | Freeman et al. |

(56) References Cited

U.S. PATENT DOCUMENTS

| | | |
|---|---|---|
| 2010/0312547 A1 | 12/2010 | van Os et al. |
| 2010/0318576 A1 | 12/2010 | Kim |
| 2010/0332235 A1 | 12/2010 | David |
| 2010/0332348 A1 | 12/2010 | Cao |
| 2011/0060807 A1 | 3/2011 | Martin et al. |
| 2011/0082688 A1 | 4/2011 | Kim et al. |
| 2011/0112827 A1 | 5/2011 | Kennewick et al. |
| 2011/0112921 A1 | 5/2011 | Kennewick et al. |
| 2011/0119049 A1 | 5/2011 | Ylonen |
| 2011/0125540 A1 | 5/2011 | Jang et al. |
| 2011/0130958 A1 | 6/2011 | Stahl et al. |
| 2011/0131036 A1 | 6/2011 | Di Cristo et al. |
| 2011/0131045 A1 | 6/2011 | Cristo et al. |
| 2011/0144999 A1 | 6/2011 | Jang et al. |
| 2011/0161076 A1 | 6/2011 | Davis et al. |
| 2011/0175810 A1 | 7/2011 | Markovic et al. |
| 2011/0184730 A1 | 7/2011 | LeBeau et al. |
| 2011/0218855 A1 | 9/2011 | Cao et al. |
| 2011/0231182 A1 | 9/2011 | Weider et al. |
| 2011/0231188 A1 | 9/2011 | Kennewick et al. |
| 2011/0264643 A1 | 10/2011 | Cao |
| 2011/0279368 A1 | 11/2011 | Klein et al. |
| 2011/0306426 A1 | 12/2011 | Novak et al. |
| 2012/0002820 A1 | 1/2012 | Leichter |
| 2012/0016678 A1 | 1/2012 | Gruber et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022874 A1 | 1/2012 | Lloyd et al. |
| 2012/0022876 A1 | 1/2012 | LeBeau et al. |
| 2012/0023088 A1 | 1/2012 | Cheng et al. |
| 2012/0034904 A1 | 2/2012 | LeBeau et al. |
| 2012/0035908 A1 | 2/2012 | LeBeau et al. |
| 2012/0035924 A1 | 2/2012 | Jitkoff et al. |
| 2012/0035931 A1 | 2/2012 | LeBeau et al. |
| 2012/0035932 A1 | 2/2012 | Jitkoff et al. |
| 2012/0042343 A1 | 2/2012 | Laligand et al. |
| 2012/0271676 A1 | 10/2012 | Aravamudan et al. |

FOREIGN PATENT DOCUMENTS

| | | |
|---|---|---|
| EP | 0138061 B1 | 9/1984 |
| EP | 0138061 A1 | 4/1985 |
| EP | 0218859 A2 | 4/1987 |
| EP | 0262938 A1 | 4/1988 |
| EP | 0293259 A2 | 11/1988 |
| EP | 0299572 A2 | 1/1989 |
| EP | 0313975 A2 | 5/1989 |
| EP | 0314908 A2 | 5/1989 |
| EP | 0327408 A2 | 8/1989 |
| EP | 0389271 A2 | 9/1990 |
| EP | 0411675 A2 | 2/1991 |
| EP | 0559349 A1 | 9/1993 |
| EP | 0559349 B1 | 9/1993 |
| EP | 0570660 A1 | 11/1993 |
| EP | 1245023 A1 | 10/2002 |
| EP | 2109295 | 10/2009 |
| JP | 06 019965 | 1/1994 |
| JP | 2001 125896 | 5/2001 |
| JP | 2002 024212 | 1/2002 |
| JP | 2003517158 A | 5/2003 |
| JP | 2009 036999 | 2/2009 |
| KR | 10-0776800 B1 | 11/2007 |
| KR | 10-0810500 B1 | 3/2008 |
| KR | 10 2008 109322 A | 12/2008 |
| KR | 10 2009 086805 A | 8/2009 |
| KR | 10-0920267 B1 | 10/2009 |
| KR | 10 2011 0113414 A | 10/2011 |
| WO | 02073603 | 9/2002 |
| WO | WO 2006/129967 A1 | 12/2006 |
| WO | 2008085742 | 7/2008 |
| WO | 2008109835 | 9/2008 |
| WO | WO 2011/088053 A2 | 7/2011 |

OTHER PUBLICATIONS

Guzzoni, Didier, et al., "Modeling Human-Agent Interaction with Active Ontologies", American Association for Artificcal Intelligence, 2007, 8 pages.

Keleher, Erin, et al., "Vlingo Launches Voice Enablement Application of Apple App Store", Cambridge, Mass., Dec. 3, 2008, www.vlingo.com. 2 pages.

Martin, D., et al., "The Open Agent Architecture: A Framework for building distributed software systems," Jan.-Mar. 1999, Applied Artificial Intelligence: An International Journal, vol. 13, No. 1-2, http://adam.cheyer.com/papers/oaa.pdf, 38 pages.

Bussler, C., et al., "Web Service Execution Environment (WSMX)," Jun. 3, 2005, W3C Member Submission, http://www.w3.org/Submission/WSMX, 29 pages.

Cheyer, A., "About Adam Cheyer," Sep. 17, 2012, http://www.adann.cheyer.com/about.html, 2 pages.

Cheyer, A., "A Perspective on AI & Agent Technologies for SCM," VerticalNet, 2001 presentation, 22 pages.

Domingue, J., et al., "Web Service Modeling Ontology (WSMO)—An Ontology for Semantic Web Services," Jun. 9-10, 2005, position paper at the W3C Workshop on Frameworks for Semantics in Web Services, Innsbruck, Austria, 6 pages.

Guzzoni, D., et al., "A Unified Platform for Building Intelligent Web Interaction Assistants," Proceedings of the 2006 IEEE/WIC/ACM International Conference on Web Intelligence and Intelligent Agent Technology, Computer Society, 4 pages.

Roddy, D., et al., "Communication and Collaboration in a Landscape of B2B eMarketplaces," VerticalNet Solutions, white paper, Jun. 15, 2000, 23 pages.

Alfred App, 2011, http://www.alfredapp.com/, 5 pages.

Ambite, JL., et al., "Design and Implementation of the CALO Query Manager," Copyright © 2006, American Association for Artificial Intelligence, (www.aaai.org), 8 pages.

Ambite, JL., et al., "Integration of Heterogeneous Knowledge Sources in the CALO Query Manager," 2005, The 4th International Conference on Ontologies, DataBases, and Applications of Semantics (ODBASE), Agia Napa, Cyprus, ttp://www.isi.edu/people/ambite/publications/integration_heterogeneous_knowledge_sources_calo_query_manager, 18 pages.

Belvin, R. et al., "Development of the HRL Route Navigation Dialogue System," 2001, In Proceedings of the First International Conference on Human Language Technology Research, Paper, Copyright © 2001 HRL Laboratories, LLC, http://citeseerx.ist.psu.edu/viewdoc/summary?doi=10.1.1.10.6538, 5 pages.

Berry, P. M., et al. "PTIME: Personalized Assistance for Calendaring," ACM Transactions on Intelligent Systems and Technology, vol. 2, No. 4, Article 40, Publication date: Jul. 2011, 40:1-22, 22 pages.

Butcher, M., "EVI arrives in town to go toe-to-toe with Siri," Jan. 23, 2012, http://techcrunch.com/2012/01/23/evi-arrives-in-town-to-go-toe-to-toe-with-siri/, 2 pages.

Chen, Y., "Multimedia Siri Finds and Plays Whatever You Ask for," Feb. 9, 2012, http://www.psfk.com/2012/02/multimedia-siri.html, 9 pages.

Cheyer, A. et al., "Spoken Language and Multimodal Applications for Electronic Realties," © Springer-Verlag London Ltd, Virtual Reality 1999, 3:1-15, 15 pages.

Cutkosky, M. R. et al., "PACT: An Experiment in Integrating Concurrent Engineering Systems," Journal, Computer, vol. 26 Issue 1, Jan. 1993, IEEE Computer Society Press Los Alamitos, CA, USA, http://dl.acm.org/citation.cfm?id=165320, 14 pages.

Elio, R. et al., "On Abstract Task Models and Conversation Policies," http://webdocs.cs.ualberta.ca/~ree/publications/papers2/ATS.AA99.pdf, 10 pages.

Ericsson, S. et al., "Software illustrating a unified approach to multimodality and multilinguality in the in-home domain," Dec. 22,

(56) References Cited

OTHER PUBLICATIONS

2006, Talk and Look: Tools for Ambient Linguistic Knowledge, http://www.talk-project.eurice.eu/fileadmin/talk/publications_public/deliverables_public/D1_6.pdf, 127 pages.

Evi, "Meet Evi: the one mobile app that provides solutions for your everyday problems," Feb. 8, 2012, http://www.evi.com/, 3 pages.

Feigenbaum, E., et al., "Computer-assisted Semantic Annotation of Scientific Life Works," 2007, http://tomgruber.org/writing/stanford-cs300.pdf, 22 pages.

Gannes, L., "Alfred App Gives Personalized Restaurant Recommendations," allthingsd.com, Jul. 18, 2011, http://allthingsd.com/20110718/alfred-app-gives-personalized-restaurant-recommendations/, 3 pages.

Gautier, P. O., et al. "Generating Explanations of Device Behavior Using Compositional Modeling and Causal Ordering," 1993, http://citeseerx.ist.psu.edu/viewdoc/summary?doi=10.1.1.42.8394, 9 pages.

Gervasio, M. T., et al., Active Preference Learning for Personalized Calendar Scheduling Assistancae, Copyright © 2005, http://www.ai.sri.com/~gervasio/pubs/gervasio-iui05.pdf, 8 pages.

Glass, A., "Explaining Preference Learning," 2006, http://cs229.stanford.edu/proj2006/Glass-ExplainingPreferenceLearning.pdf, 5 pages.

Gruber, T. R., et al., "An Ontology for Engineering Mathematics," In Jon Doyle, Piero Torasso, & Erik Sandewall, Eds., Fourth International Conference on Principles of Knowledge Representation and Reasoning, Gustav Stresemann Institut, Bonn, Germany, Morgan Kaufmann, 1994, http://www-ksl.stanford.edu/knowledge-sharing/papers/engmath.html, 22 pages.

Gruber, T. R., "A Translation Approach to Portable Ontology Specifications," Knowledge Systems Laboratory, Stanford University, Sep. 1992, Technical Report KSL 92-71, Revised Apr. 1993, 27 pages.

Gruber, T. R., "Automated Knowledge Acquisition for Strategic Knowledge," Knowledge Systems Laboratory, Machine Learning, 4, 293-336 (1989), 44 pages.

Gruber, T. R., "(Avoiding) the Travesty of the Commons," Presentation at NPUC 2006, New Paradigms for User Computing, IBM Almaden Research Center, Jul. 24, 2006. http://tomgruber.org/writing/avoiding-travestry.htm, 52 pages.

Gruber, T. R., "Big Think Small Screen: How semantic computing in the cloud will revolutionize the consumer experience on the phone," Keynote presentation at Web 3.0 conference, Jan. 27, 2010, http://tomgruber.org/writing/web30jan2010.htm, 41 pages.

Gruber, T. R., "Collaborating around Shared Content on the WWW," W3C Workshop on WWW and Collaboration, Cambridge, MA, Sep. 11, 1995, http://www.w3.org/Collaboration/Workshop/Proceedings/P9.html, 1 page.

Gruber, T. R., "Collective Knowledge Systems: Where the Social Web meets the Semantic Web," Web Semantics: Science, Services and Agents on the World Wide Web (2007), doi:10.1016/j.websem.2007.11.011, keynote presentation given at the 5th International Semantic Web Conference, Nov. 7, 2006, 19 pages.

Gruber, T. R., "Where the Social Web meets the Semantic Web," Presentation at the 5th International Semantic Web Conference, Nov. 7, 2006, 38 pages.

Gruber, T. R., "Despite our Best Efforts, Ontologies are not the Problem," AAAI Spring Symposium, Mar. 2008, http://tomgruber.org/writing/aaai-ss08.htm, 40 pages.

Gruber, T. R., "Enterprise Collaboration Management with Intraspect," Intraspect Software, Inc., Instraspect Technical White Paper Jul. 2001, 24 pages.

Gruber, T. R., "Every ontology is a treaty—a social agreement—among people with some common motive in sharing," Interview by Dr. Miltiadis D. Lytras, Official Quarterly Bulletin of AIS Special Interest Group on Semantic Web and Information Systems, vol. 1, Issue 3, 2004, http://www.sigsemis.org 1, 5 pages.

Gruber, T. R., et al., "Generative Design Rationale: Beyond the Record and Replay Paradigm," Knowledge Systems Laboratory, Stanford University, Dec. 1991, Technical Report KSL 92-59, Updated Feb. 1993, 24 pages.

Gruber, T. R., "Helping Organizations Collaborate, Communicate, and Learn," Presentation to NASA Ames Research, Mountain View, CA, Mar. 2003, http://tomgruber.org/writing/organizational-intelli-gence-talk.htm, 30 pages.

Gruber, T. R., "Intelligence at the Interface: Semantic Technology and the Consumer Internet Experience," Presentation at Semantic Technologies conference (SemTech08), May 20, 2008, http://tomgruber.org/writing.htm, 40 pages.

Gruber, T. R., Interactive Acquisition of Justifications: Learning "Why" by Being Told "What" Knowledge Systems Laboratory, Stanford University, Oct. 1990, Technical Report KSL 91-17, Revised Feb. 1991, 24 pages.

Gruber, T. R., "It Is What It Does: The Pragmatics of Ontology for Knowledge Sharing," (c) 2000, 2003, http://www.cidoc-crm.org/docs/symposium_presentations/gruber_cidoc-ontology-2003.pdf, 21 pages.

Gruber, T. R., et al., "Machine-generated Explanations of Engineering Models: A Compositional Modeling Approach," (1993) In Proc. International Joint Conference on Artificial Intelligence, http://citeseerx.ist.psu.edu/viewdoc/summary?doi=10.1.1.34.930, 7 pages.

Gruber, T. R., "2021: Mass Collaboration and the Really New Economy," TNTY Futures, the newsletter of The Next Twenty Years series, vol. 1, Issue 6, Aug. 2001, http://www.tnty.com/newsletter/futures/archive/v01-05business.html, 5 pages.

Gruber, T. R., et al.,"NIKE: A National Infrastructure for Knowledge Exchange," Oct. 1994, http://www.eit.com/papers/nike/nike.html and nike.ps, 10 pages.

Gruber, T. R., "Ontologies, Web 2.0 and Beyond," Apr. 24, 2007, Ontology Summit 2007, http://tomgruber.org/writing/ontolog-social-web-keynote.pdf, 17 pages.

Gruber, T. R., "Ontology of Folksonomy: A Mash-up of Apples and Oranges," Originally published to the web in 2005, Int'l Journal on Semantic Web & Information Systems, 3(2), 2007, 7 pages.

Gruber, T. R., "Siri, a Virtual Personal Assistant—Bringing Intelligence to the Interface," Jun. 16, 2009, Keynote presentation at Semantic Technologies conference, Jun. 2009. http://tomgruber.org/writing/semtech09.htm, 22 pages.

Gruber, T. R., "TagOntology," Presentation to Tag Camp, www.tagcamp.org, Oct. 29, 2005, 20 pages.

Gruber, T. R., et al., "Toward a Knowledge Medium for Collaborative Product Development," In Artificial Intelligence in Design 1992, from Proceedings of the Second International Conference on Artificial Intelligence in Design, Pittsburgh, USA, Jun. 22-25, 1992, 19 pages.

Gruber, T. R., "Toward Principles for the Design of Ontologies Used for Knowledge Sharing," In International Journal Human-Computer Studies 43, p. 907-928, substantial revision of paper presented at the International Workshop on Formal Ontology, Mar. 1993, Padova, Italy, available as Technical Report KSL 93-04, Knowledge Systems Laboratory, Stanford University, further revised Aug. 23, 1993, 23 pages.

Guzzoni, D., et al., "Active, A Platform for Building Intelligent Operating Rooms," Surgetica 2007 Computer-Aided Medical Interventions: tools and applications, pp. 191-198, Paris, 2007, Sauramps Medical, http://lsro.epfl.ch/p.-68384-en.html, 8 pages.

Guzzoni, D., et al., "Active, A Tool for Building Intelligent User Interfaces," ASC 2007, Palma de Mallorca, http://lsro.epfl.ch/page-34241.html, 6 pages.

Guzzoni, D., et al., "Modeling Human-Agent Interaction with Active Ontologies," 2007, AAAI Spring Symposium, Interaction Challenges for Intelligent Assistants, Stanford University, Palo Alto, California, 8 pages.

Hardawar, D., "Driving app Waze builds its own Siri for hands-free voice control," Feb. 9, 2012, http://venturebeat.com/2012/02/09/driving-app-waze-builds-its-own-siri-for-hands-free-voice-control/, 4 pages.

(56) References Cited

OTHER PUBLICATIONS

Intraspect Software, "The Intraspect Knowledge Management Solution: Technical Overview," http://tomgruber.org/writing/intraspect-whitepaper-1998.pdf, 18 pages.
Julia, L., et al., Un éditeur interactif de tableaux dessinés à main levée (an Interactive Editor for Hand-Sketched Tables), Traitement du Signal 1995, vol. 12, No. 6, 8 pages. No English Translation Available.
Karp, P. D., "A Generic Knowledge-Base Access Protocol," May 12, 1994, http://lecture.cs.buu.ac.th/~f50353/Document/gfp.pdf, 66 pages.
Lemon, O., et al., "Multithreaded Context for Robust Conversational Interfaces: Context-Sensitive Speech Recognition and Interpretation of Corrective Fragments," Sep. 2004, ACM Transactions on Computer-Human Interaction, vol. 11, No. 3, 27 pages.
Leong, L., et al., "CASIS: A Context-Aware Speech Interface System," IUI'05, Jan. 9-12, 2005, Proceedings of the 10th international conference on Intelligent user interfaces, San Diego, California, USA, 8 pages.
Lieberman, H., et al., "Out of context: Computer systems that adapt to, and learn from, context," 2000, IBM Systems Journal, vol. 39, Nos. 3/4, 2000, 16 pages.
Lin, B., et al., "A Distributed Architecture for Cooperative Spoken Dialogue Agents with Coherent Dialogue State and History," 1999, http://citeseerx.ist.psu.edu/viewdoc/sumnnary?doi=10.1.1.42.272, 4 pages.
McGuire, J., et al., "SHADE: Technology for Knowledge-Based Collaborative Engineering," 1993, Journal of Concurrent Engineering: Applications and Research (CERA), 18 pages.
Milward, D., et al., "D2.2: Dynamic Multimodal Interface Reconfiguration," Talk and Look: Tools for Ambient Linguistic Knowledge, Aug. 8, 2006, http://www.ihmc.us/users/nblaylock/Pubs/Files/talk_d2.2.pdf, 69 pages.
Mitra, P., et al., "A Graph-Oriented Model for Articulation of Ontology Interdependencies," 2000, http://ilpubs.stanford.edu:8090/442/1/2000-20.pdf, 15 pages.
Moran, D. B., et al., "Multimodal User Interfaces in the Open Agent Architecture," Proc. of the 1997 International Conference on Intelligent User Interfaces (IU197), 8 pages.
Mozer, M., "An Intelligent Environment Must be Adaptive," Mar./Apr. 1999, IEEE Intelligent Systems, 3 pages.
Mühlhäuser, M., "Context Aware Voice User Interfaces for Workflow Support," Darmstadt 2007, http://tuprints.ulb.tu-darmstadt.de/876/1/PhD.pdf, 254 pages.
Naone, E., "TR10: Intelligent Software Assistant," Mar.-Apr. 2009, Technology Review, http://www.technologyreview.com/printer_friendly_article.aspx?id=22117, 2 pages.
Neches, R., "Enabling Technology for Knowledge Sharing," Fall 1991, Al Magazine, pp. 37-56, (21 pages).
Nöth, E., et al., "Verbmobil: The Use of Prosody in the Linguistic Components of a Speech Understanding System," IEEE Transactions on Speech and Audio Processing, vol. 8, No. 5, Sep. 2000, 14 pages.
Rice, J., et al., "Monthly Program: Nov. 14, 1995," The San Francisco Bay Area Chapter of ACM SIGCHI, http://www.baychi.org/calendar/19951114/, 2 pages.
Rice, J., et al.; "Using the Web Instead of a Window System," Knowledge Systems Laboratory, Stanford University, http://tomgruber.org/writing/ks1-95-69.pdf, 14 pages.
Rivlin, Z., et al., "Maestro: Conductor of Multimedia Analysis Technologies," 1999 SRI International, Communications of the Association for Computing Machinery (CACM), 7 pages.
Sheth, A., et al., "Relationships at the Heart of Semantic Web: Modeling, Discovering, and Exploiting Complex Semantic Relationships," Oct. 13, 2002, Enhancing the Power of the Internet: Studies in Fuzziness and Soft Computing, SpringerVerlag, 38 pages.
Simonite, T., "One Easy Way to Make Siri Smarter," Oct. 18, 2011, Technology Review, http:// www.technologyreview.com/printer_friendly_article.aspx?id=38915, 2 pages.
Stent, A., et al., "The CommandTalk Spoken Dialogue System," 1999, http://acl.ldc.upenn.edu/P/P99/P99-1024.pdf, 8 pages.
Tofel, K., et al., "SpeakToIt: A personal assistant for older iPhones, iPads," Feb. 9, 2012, http://gigaom.com/apple/speaktoit-siri-for-older-iphones-ipads/, 7 pages.
Tucker, J., "Too lazy to grab your TV remote? Use Siri instead," Nov. 30, 2011, http://www.engadget.com/2011/11/30/too-lazy-to-grab-your-tv-remote-use-siri-instead/, 8 pages.
Tur, G., et al., "The CALO Meeting Speech Recognition and Understanding System," 2008, Proc. IEEE Spoken Language Technology Workshop, 4 pages.
Tur, G., et al., "The-CALO-Meeting-Assistant System," IEEE Transactions on Audio, Speech, and Language Processing, vol. 18, No. 6, Aug. 2010, 11 pages.
Vlingo, "Vlingo Launches Voice Enablement Application on Apple App Store," Vlingo press release dated Dec. 3, 2008, 2 pages.
YouTube, "Knowledge Navigator," 5:34 minute video uploaded to YouTube by Knownav on Apr. 29, 2008, http://www.youtube.com/watch?v=QRH8eimU_20on Aug. 3, 2006, 1 page.
YouTube, "Send Text, Listen to and Send E-Mail 'By Voice' www.voiceassist.com," 2:11 minute video uploaded to YouTube by VoiceAssist on Jul 30, 2009, http://www.youtube.com/watch?v=0tEU61nHHA4, 1 page.
YouTube, "Text'nDrive App Demo—Listen and Reply to your Messages by Voice while Driving!," 1:57 minute video uploaded to YouTube by TextnDrive on Apr 27, 2010, http://www.youtube.com/watch?v=WaGfzoHsAMw, 1 page.
YouTube, "Voice on the Go (BlackBerry)," 2:51 minute video uploaded to YouTube by VoiceOnTheGo on Jul. 27, 2009, http://www.youtube.com/watch?v=pJqpWgQS98w, 1 page.
International Search Report and Written Opinion dated Nov. 29, 2011, received in International Application No. PCT/US2011/20861, which corresponds to U.S. Appl. No. 12/987,982, 15 pages. (Thomas Robert Gruber).
Glass, J., et al., "Multilingual Spoken-Language Understanding in the MIT Voyager System," Aug. 1995, http://groups.csail.mit.edu/sls/publications/1995/speechcomm95-voyager.pdf, 29 pages.
Goddeau, D., et al., "A Form-Based Dialogue Manager for Spoken Language Applications," Oct. 1996, http://phasedance.com/pdf/icslp96.pdf, 4 pages.
Goddeau, D., et al., "Galaxy: A Human-Language Interface to On-Line Travel Information," 1994 International Conference on Spoken Language Processing, Sep. 18-22, 1994, Pacific Convention Plaza Yokohama, Japan, 6 pages.
Meng, H., et al., "Wheels: A Conversational System in the Automobile Classified Domain," Oct. 1996, httphttp://citeseerx.ist.psu.edu/viewdoc/summary?doi=10.1.1.16.3022, 4 pages.
*Phoenix Solutions, Inc. v. West Interactive Corp.*, Document 40, Declaration of Christopher Schmandt Regarding the MIT Galaxy System dated Jul. 2, 2010, 162 pages.
Seneff, S., et al., "A New Restaurant Guide Conversational System: Issues in Rapid Prototyping for Specialized Domains," Oct. 1996, citeseerx.ist.psu.edu/viewdoc/download?doi=10.1.1.16 . . . rep . . . , 4 pages.
Vlingo InCar, "Distracted Driving Solution with Vlingo InCar," 2:38 minute video uploaded to YouTube by Vlingo Voice on Oct. 6, 2010, http://www.youtube.com/watch?v=Vqs8XfXxgz4, 2 pages.
Zue, V., "Conversational Interfaces: Advances and Challenges," Sep. 1997, http://www.cs.cmu.edu/~dod/papers/zue97.pdf, 10 pages.
Zue, V. W., "Toward Systems that Understand Spoken Language," Feb. 1994, ARPA Strategic Computing Institute, ©1994 IEEE, 9 pages.
Acero, A., et al., "Environmental Robustness in Automatic Speech Recognition," International Conference on Acoustics, Speech, and Signal Processing (ICASSP'90), Apr. 3-6, 1990, 4 pages.
Acero, A., et al., "Robust Speech Recognition by Normalization of The Acoustic Space," International Conference on Acoustics, Speech, and Signal Processing, 1991, 4 pages.
Ahlbom, G., et al., "Modeling Spectral Speech Transitions Using Temporal Decomposition Techniques," IEEE International Conference of Acoustics, Speech, and Signal Processing (ICASSP'87), Apr. 1987, vol. 12, 4 pages.

(56) References Cited

OTHER PUBLICATIONS

Aikawa, K., "Speech Recognition Using Time-Warping Neural Networks," Proceedings of the 1991 IEEE Workshop on Neural Networks for Signal Processing, Sep. 30 to Oct. 1, 1991, 10 pages.
Anastasakos, A., et al., "Duration Modeling in Large Vocabulary Speech Recognition," International Conference on Acoustics, Speech, and Signal Processing (ICASSP'95), May 9-12, 1995, 4 pages.
Anderson, R. H., "Syntax-Directed Recognition of Hand-Printed Two-Dimensional Mathematics," In Proceedings of Symposium on Interactive Systems for Experimental Applied Mathematics: Proceedings of the Association for Computing Machinery Inc. Symposium, ©1967, 12 pages.
Ansari, R., et al., "Pitch Modification of Speech using a Low-Sensitivity Inverse Filter Approach," IEEE Signal Processing Letters, vol. 5, No. 3, Mar. 1998, 3 pages.
Anthony, N. J., et al., "Supervised Adaption for Signature Verification System," Jun. 1, 1978, IBM Technical Disclosure, 3 pages.
Apple Computer, "Guide Maker User's Guide," @ Apple Computer, Inc., Apr. 27, 1994, 8 pages.
Apple Computer, "Introduction to Apple Guide," © Apple Computer, Inc., Apr. 28, 1994, 20 pages.
Asanović, K., et al., "Experimental Determination of Precision Requirements for Back-Propagation Training of Artificial Neural Networks," In Proceedings of the 2nd International Conference of Microelectronics for Neural Networks, 1991, www.ICSI.Berkeley.EDU, 7 pages.
Atal, B. S., "Efficient Coding of LPC Parameters by Temporal Decomposition," IEEE International Conference on Acoustics, Speech, and Signal Processing (ICASSP'83), Apr. 1983, 4 pages.
Bahl, L. R., et al., "Acoustic Markov Models Used in the Tangora Speech Recognition System," In Proceeding of International Conference on Acoustics, Speech, and Signal Processing (ICASSP'88), Apr. 11-14, 1988, vol. 1, 4 pages.
Bahl, L. R., et al., "A Maximum Likelihood Approach to Continuous Speech Recognition," IEEE Transaction on Pattern Analysis and Machine Intelligence, vol. PAMI-5, No. 2, Mar. 1983, 13 pages.
Bahl, L. R., et al., "A Tree-Based Statistical Language Model for Natural Language Speech Recognition," IEEE Transactions on Acoustics, Speech and Signal Processing, vol. 37, Issue 7, Jul. 1989, 8 pages.
Bahl, L. R., et al., "Large Vocabulary Natural Language Continuous Speech Recognition," In Proceedings of 1989 International Conference on Acoustics, Speech, and Signal Processing, May 23-26, 1989, vol. 1, 6 pages.
Bahl, L. R., et al, "Multonic Markov Word Models for Large Vocabulary Continuous Speech Recognition," IEEE Transactions on Speech and Audio Processing, vol. 1, No. 3, Jul. 1993, 11 pages.
Bahl, L. R., et al., "Speech Recognition with Continuous-Parameter Hidden Markov Models," In Proceeding of International Conference on Acoustics, Speech, and Signal Processing (ICASSP'88), Apr. 11-14, 1988, vol. 1, 8 pages.
Banbrook, M., "Nonlinear Analysis of Speech from a Synthesis Perspective," A thesis submitted for the degree of Doctor of Philosophy, The University of Edinburgh, Oct. 15, 1996, 35 pages.
Belaid, A., et al., "A Syntactic Approach for Handwritten Mathematical Formula Recognition," IEEE Transactions on Pattern Analysis and Machine Intelligence, vol. PAMI-6, No. 1, Jan. 1984, 7 pages.
Bellegarda, E. J., et al., "On-Line Handwriting Recognition Using Statistical Mixtures," Advances in Handwriting and Drawings: A Multidisciplinary Approach, Europia, 6th International IGS Conference on Handwriting and Drawing, Paris—France, Jul. 1993, 11 pages.
Bellegarda, J. R., "A Latent Semantic Analysis Framework for Large-Span Language Modeling," 5th European Conference on Speech, Communication and Technology, (Eurospeech'97), Sep. 22-25, 1997, 4 pages.
Bellegarda, J. R., "A Multispan Language Modeling Framework for Large Vocabulary Speech Recognition," IEEE Transactions on Speech and Audio Processing, vol. 6, No. 5, Sep. 1998, 12 pages.
Bellegarda, J. R., et al., "A Novel Word Clustering Algorithm Based on Latent Semantic Analysis," In Proceedings of the IEEE International Conference on Acoustics, Speech, and Signal Processing (ICASSP'96), vol. 1, 4 pages.
Bellegarda, J. R., et al., "Experiments Using Data Augmentation for Speaker Adaptation," International Conference on Acoustics, Speech, and Signal Processing (ICASSP'95), May 9-12, 1995, 4 pages.
Bellegarda, J. R., "Exploiting Both Local and Global Constraints for Multi-Span Statistical Language Modeling," Proceeding of the 1998 IEEE International Conference on Acoustics, Speech, and Signal Processing (ICASSP'98), vol. 2, May 12-15 1998, 5 pages.
Bellegarda, J. R., "Exploiting Latent Semantic Information in Statistical Language Modeling," In Proceedings of the IEEE, Aug. 2000, vol. 88, No. 8, 18 pages.
Bellegarda, J. R., "Interaction-Driven Speech Input—A Data-Driven Approach to the Capture of Both Local and Global Language Constraints," 1992, 7 pages, available at http://old.sigchi.org/bulletin/1998.2/bellegarda.html.
Bellegarda, J. R., "Large Vocabulary Speech Recognition with Multispan Statistical Language Models," IEEE Transactions on Speech and Audio Processing, vol. 8, No. 1, Jan. 2000, 9 pages.
Bellegarda, J. R., et al., "Performance of the IBM Large Vocabulary Continuous Speech Recognition System on the ARPA Wall Street Journal Task," Signal Processing VII: Theories and Applications, © 1994 European Association for Signal Processing, 4 pages.
Bellegarda, J. R., et al., "The Metamorphic Algorithm: A Speaker Mapping Approach to Data Augmentation," IEEE Transactions on Speech and Audio Processing, vol. 2, No. 3, Jul. 1994, 8 pages.
Black, A. W., et al., "Automatically Clustering Similar Units for Unit Selection in Speech Synthesis," In Proceedings of Eurospeech 1997, vol. 2, 4 pages.
Blair, D. C., et al., "An Evaluation of Retrieval Effectiveness for a Full-Text Document-Retrieval System," Communications of the ACM, vol. 28, No. 3, Mar. 1985, 11 pages.
Briner, L. L., "Identifying Keywords in Text Data Processing," In Zelkowitz, Marvin V., ED, Directions and Challenges,15th Annual Technical Symposium, Jun. 17, 1976, Gaithersbury, Maryland, 7 pages.
Bulyko, I., et al., "Joint Prosody Prediction and Unit Selection for Concatenative Speech Synthesis," Electrical Engineering Department, University of Washington, Seattle, 2001, 4 pages.
Bussey, H. E., et al., "Service Architecture, Prototype Description, and Network Implications of a Personalized Information Grazing Service," INFOCOM'90, Ninth Annual Joint Conference of the IEEE Computer and Communication Societies, Jun. 3-7 1990, http://slrohall.com/publications/, 8 pages.
Buzo, A., et al., "Speech Coding Based Upon Vector Quantization," IEEE Transactions on Acoustics, Speech, and Signal Processing, vol. ASSP-28, No. 5, Oct. 1980, 13 pages.
Caminero-Gil, J., et al., "Data-Driven Discourse Modeling for Semantic Interpretation," In Proceedings of the IEEE International Conference on Acoustics, Speech, and Signal Processing, May 7-10, 1996, 6 pages.
Cawley, G. C., "The Application of Neural Networks to Phonetic Modelling," PhD Thesis, University of Essex, Mar. 1996, 13 pages.
Chang, S., et al., "A Segment-based Speech Recognition System for Isolated Mandarin Syllables," Proceedings TENCON '93, IEEE Region 10 conference on Computer, Communication, Control and Power Engineering, Oct. 19-21, 1993, vol. 3, 6 pages.
Conklin, J., "Hypertext: An Introduction and Survey," Computer Magazine, Sep. 1987, 25 pages.
Connolly, F. T., et al., "Fast Algorithms for Complex Matrix Multiplication Using Surrogates," IEEE Transactions on Acoustics, Speech, and Signal Processing, Jun. 1989, vol. 37, No. 6, 13 pages.
Deerwester, S., et al., "Indexing by Latent Semantic Analysis," Journal of the American Society for Information Science, vol. 41, No. 6, Sep. 1990, 19 pages.
Deller, Jr., J. R., et al., "Discrete-Time Processing of Speech Signals," © 1987 Prentice Hall, ISBN: 0-02-328301-7, 14 pages.

(56) References Cited

OTHER PUBLICATIONS

Digital Equipment Corporation, "Open VMS Software Overview," Dec. 1995, software manual, 159 pages.
Donovan, R. E., "A New Distance Measure for Costing Spectral Discontinuities in Concatenative Speech Synthesisers," 2001, http://citeseerx.ist.psu.edu/viewdoc/summary?doi=10.1.1.21.6398, 4 pages.
Frisse, M. E., "Searching for Information in a Hypertext Medical Handbook," Communications of the ACM, vol. 31, No. 7, Jul. 1988, 8 pages.
Goldberg, D., et al., "Using Collaborative Filtering to Weave an Information Tapestry," Communications of the ACM, vol. 35, No. 12, Dec. 1992, 10 pages.
Gorin, A. L., et al., "On Adaptive Acquisition of Language," International Conference on Acoustics, Speech, and Signal Processing (ICASSP'90), vol. 1, Apr. 3-6, 1990, 5 pages.
Gotoh, Y., et al., "Document Space Models Using Latent Semantic Analysis," In Proceedings of Eurospeech, 1997, 4 pages.
Gray, R. M., "Vector Quantization," IEEE ASSP Magazine, Apr. 1984, 26 pages.
Harris, F. J., "On the Use of Windows for Harmonic Analysis with the Discrete Fourier Transform," In Proceedings of the IEEE, vol. 66, No. 1, Jan. 1978, 34 pages.
Helm, R., et al., "Building Visual Language Parsers," In Proceedings of CHI'91 Proceedings of the SIGCHI Conference on Human Factors in Computing Systems, 8 pages.
Hermansky, H., "Perceptual Linear Predictive (PLP) Analysis of Speech," Journal of the Acoustical Society of America, vol. 87, No. 4, Apr. 1990, 15 pages.
Hermansky, H., "Recognition of Speech in Additive and Convolutional Noise Based on Rasta Spectral Processing," In proceedings of IEEE International Conference on Acoustics, speech, and Signal Processing (ICASSP'93), Apr. 27-30, 1993, 4 pages.
Hoehfeld M., et al., "Learning with Limited Numerical Precision Using the Cascade-Correlation Algorithm," IEEE Transactions on Neural Networks, vol. 3, No. 4, Jul. 1992, 18 pages.
Holmes, J. N., "Speech Synthesis and Recognition—Stochastic Models for Word Recognition," Speech Synthesis and Recognition, Published by Chapman & Hall, London, ISBN 0 412 53430 4, © 1998 J. N. Holmes, 7 pages.
Hon, H.W., et al., "CMU Robust Vocabulary-Independent Speech Recognition System," IEEE International Conference on Acoustics, Speech, and Signal Processing (ICASSP-91), Apr. 14-17, 1991, 4 pages.
IBM Technical Disclosure Bulletin, "Speech Editor," vol. 29, No. 10, Mar. 10, 1987, 3 pages.
IBM Technical Disclosure Bulletin, "Integrated Audio-Graphics User Interface," vol. 33, No. 11, Apr. 1991, 4 pages.
IBM Technical Disclosure Bulletin, "Speech Recognition with Hidden Markov Models of Speech Waveforms," vol. 34, No. 1, Jun. 1991, 10 pages.
Iowegian International, "FIR Filter Properties," dspGuro, Digital Signal Processing Central, http://www.dspguru.com/dsp/taqs/fir/properties, downloaded on Jul. 28, 2010, 6 pages.
Jacobs, P. S., et al., "Scisor: Extracting Information from On-Line News," Communications of the ACM, vol. 33, No. 11, Nov. 1990, 10 pages.
Jelinek, F., "Self-Organized Language Modeling for Speech Recognition," Readings in Speech Recognition, edited by Alex Waibel and Kai-Fu Lee, May 15, 1990, © 1990 Morgan Kaufmann Publishers, Inc., ISBN: 1-55860-124-4, 63 pages.
Jennings, A., et al., "A Personal News Service Based on a User Model Neural Network," IEICE Transactions on Information and Systems, vol. E75-D, No. 2, Mar. 1992, Tokyo, JP, 12 pages.
Ji, T., et al., "A Method for Chinese Syllables Recognition based upon Sub-syllable Hidden Markov Model," 1994 International Symposium on Speech, Image Processing and Neural Networks, Apr. 13-16, 1994, Hong Kong, 4 pages.
Jones, J., "Speech Recognition for Cyclone," Apple Computer, Inc., E.R.S., Revision 2.9, Sep. 10, 1992, 93 pages.
Katz, S. M., "Estimation of Probabilities from Sparse Data for the Language Model Component of a Speech Recognizer," IEEE Transactions on Acoustics, Speech, and Signal Processing, vol. ASSP-35, No. 3, Mar. 1987, 3 pages.
Kitano, H., "PhiDM-Dialog, An Experimental Speech-to-Speech Dialog Translation System," Jun. 1991 Computer, vol. 24, No. 6, 13 pages.
Klabbers, E., et al., "Reducing Audible Spectral Discontinuities," IEEE Transactions on Speech and Audio Processing, vol. 9, No. 1, Jan. 2001, 13 pages.
Klatt, D. H., "Linguistic Uses of Segmental Duration in English: Acoustic and Perpetual Evidence," Journal of the Acoustical Society of America, vol. 59, No. 5, May 1976, 16 pages.
Kominek, J., et al., "Impact of Durational Outlier Removal from Unit Selection Catalogs," 5th ISCA Speech Synthesis Workshop, Jun. 14-16, 2004, 6 pages.
Kubala, F., et al., "Speaker Adaptation from a Speaker-Independent Training Corpus," International Conference on Acoustics, Speech, and Signal Processing (ICASSP'90), Apr. 3-6, 1990, 4 pages.
Kubala, F., et al., "The Hub and Spoke Paradigm for CSR Evaluation," Proceedings of the Spoken Language Technology Workshop, Mar. 6-8, 1994, 9 pages.
Lee, K.F., "Large-Vocabulary Speaker-Independent Continuous Speech Recognition: The SPHINX System," Apr. 18, 1988, Partial fulfillment of the requirements for the degree of Doctor of Philosophy, Computer Science Department, Carnegie Mellon University, 195 pages.
Lee, L., et al., "A Real-Time Mandarin Dictation Machine for Chinese Language with Unlimited Texts and Very Large Vocabulary," International Conference on Acoustics, Speech and Signal Processing, vol. 1, Apr. 3-6, 1990, 5 pages.
Lee, L, et al., "Golden Mandarin(II)—An Improved Single-Chip Real-Time Mandarin Dictation Machine for Chinese Language with Very Large Vocabulary," 0-7803-0946-4-93 ©1993IEEE, 4 pages.
Lee, L, et al., "Golden Mandarin(II)—An Intelligent Mandarin Dictation Machine for Chinese Character Input with Adaptation/Learning Functions," International Symposium on Speech, Image Processing and Neural Networks, Apr. 13-16, 1994, Hong Kong, 5 pages.
Lee, L., et al., "System Description of Golden Mandarin (I) Voice Input for Unlimited Chinese Characters," International Conference on Computer Processing of Chinese & Oriental Languages, vol. 5, Nos. 3 & 4, Nov. 1991, 16 pages.
Lin, C.H., et al., "A New Framework for Recognition of Mandarin Syllables With Tones Using Sub-syllabic Unites," IEEE International Conference on Acoustics, Speech, and Signal Processing (ICASSP-93), Apr. 27-30, 1993, 4 pages.
Linde, Y., et al., "An Algorithm for Vector Quantizer Design," IEEE Transactions on Communications, vol. 28, No. 1, Jan. 1980, 12 pages.
Liu, F.H., et al., "Efficient Joint Compensation of Speech for the Effects of Additive Noise and Linear Filtering," IEEE International Conference of Acoustics, Speech, and Signal Processing, ICASSP-92, Mar. 23-26, 1992, 4 pages.
Logan, B., "Mel Frequency Cepstral Coefficients for Music Modeling," In International Symposium on Music Information Retrieval, 2000, 2 pages.
Lowerre, B. T., "The-Harpy Speech Recognition System," Doctoral Dissertation, Department of Computer Science, Carnegie Mellon University, Apr. 1976, 20 pages.
Maghbouleh, A., "An Empirical Comparison of Automatic Decision Tree and Linear Regression Models for Vowel Durations," Revised version of a paper presented at the Computational Phonology in Speech Technology workshop, 1996 annual meeting of the Association for Computational Linguistics in Santa Cruz, California, 7 pages.
Markel, J. D., et al., "Linear Prediction of Speech," Springer-Verlag, Berlin Heidelberg New York 1976, 12 pages.
Morgan, B., "Business Objects," (Business Objects for Windows) Business Objects Inc., DBMS Sep. 1992, vol. 5, No. 10, 3 pages.

(56) References Cited

OTHER PUBLICATIONS

Mountford, S. J., et al., "Talking and Listening to Computers," The Art of Human-Computer Interface Design, Copyright © 1990 Apple Computer, Inc. Addison-Wesley Publishing Company, Inc., 17 pages.

Murty, K. S. R., et al., "Combining Evidence from Residual Phase and MFCC Features for Speaker Recognition," IEEE Signal Processing Letters, vol. 13, No. 1, Jan. 2006, 4 pages.

Murveit H. et al., "Integrating Natural Language Constraints into HMM-based Speech Recognition," 1990 International Conference on Acoustics, Speech, and Signal Processing, Apr. 3-6, 1990, 5 pages.

Nakagawa, S., et al., "Speaker Recognition by Combining MFCC and Phase Information," IEEE International Conference on Acoustics Speech and Signal Processing (ICASSP), Mar. 14-19, 2010, 4 pages.

Niesler, T. R., et al., "A Variable-Length Category-Based N-Gram Language Model," IEEE International Conference on Acoustics, Speech, and Signal Processing (ICASSP'96), vol. 1, May 7-10, 1996, 6 pages.

Papadimitriou, C. H., et al., "Latent Semantic Indexing: A Probabilistic Analysis," Nov. 14, 1997, http://citeseerx.ist.psu.edu/messages/downloadsexceeded.html, 21 pages.

Parsons, T. W., "Voice and Speech Processing," Linguistics and Technical Fundamentals, Articulatory Phonetics and Phonemics, © 1987 McGraw-Hill, Inc., ISBN: 0-07-0485541-0, 5 pages.

Parsons, T. W., "Voice and Speech Processing," Pitch and Formant Estimation, © 1987 McGraw-Hill, Inc., ISBN: 0-07-0485541-0, 15 pages.

Picone, J., "Continuous Speech Recognition Using Hidden Markov Models," IEEE ASSP Magazine, vol. 7, No. 3, Jul. 1990, 16 pages.

Rabiner, L. R., et al., "Fundamental of Speech Recognition," © 1993 AT&T, Published by Prentice-Hall, Inc., ISBN: 0-13-285826-6, 17 pages.

Rabiner, L. R., et al., "Note on the Properties of a Vector Quantizer for LPC Coefficients," The Bell System Technical Journal, vol. 62, No. 8, Oct. 1983, 9 pages.

Ratcliffe, M., "ClearAccess 2.0 allows SQL searches off-line," (Structured Query Language), ClearAcess Corp., MacWeek Nov. 16, 1992, vol. 6, No. 41, 2 pages.

Remde, J. R., et al., "SuperBook: An Automatic Tool for Information Exploration-Hypertext?," In Proceedings of Hypertext'87 papers, Nov. 13-15, 1987, 14 pages.

Reynolds, C. F., "On-Line Reviews: A New Application of the HICOM Conferencing System," IEE Colloquium on Human Factors in Electronic Mail and Conferencing Systems, Feb. 3, 1989, 4 pages.

Rigoll, G., "Speaker Adaptation for Large Vocabulary Speech Recognition Systems Using Speaker Markov Models," International Conference on Acoustics, Speech, and Signal Processing (ICASSP'89), May 23-26, 1989, 4 pages.

Riley, M. D., "Tree-Based Modelling of Segmental Durations," Talking Machines Theories, Models, and Designs, 1992 © Elsevier Science Publishers B.V., North-Holland, ISBN: 08-444-89115.3, 15 pages.

Rivoira, S., et al., "Syntax and Semantics in a Word-Sequence Recognition System," IEEE International Conference on Acoustics, Speech, and Signal Processing (ICASSP'79), Apr. 1979, 5 pages.

Rosenfeld, R., "A Maximum Entropy Approach to Adaptive Statistical Language Modelling," Computer Speech and Language, vol. 10, No. 3, Jul. 1996, 25 pages.

Roszkiewicz, A., "Extending your Apple," Back Talk—Lip Service, A+ Magazine, The Independent Guide for Apple Computing, vol. 2, No. 2, Feb. 1984, 5 pages.

Sakoe, H., et al., "Dynamic Programming Algorithm Optimization for Spoken Word Recognition," IEEE Transactins on Acoustics, Speech, and Signal Processing, Feb. 1978, vol. ASSP-26 No. 1, 8 pages.

Salton, G., et al., "On the Application of Syntactic Methodologies in Automatic Text Analysis," Information Processing and Management, vol. 26, No. 1, Great Britain 1990, 22 pages.

Savoy, J., "Searching Information in Hypertext Systems Using Multiple Sources of Evidence," International Journal of Man-Machine Studies, vol. 38, No. 6, Jun. 1993, 15 pages.

Scagliola, C., "Language Models and Search Algorithms for Real-Time Speech Recognition," International Journal of Man-Machine Studies, vol. 22, No. 5, 1985, 25 pages.

Schmandt, C., et al., "Augmenting a Window System with Speech Input," IEEE Computer Society, Computer Aug. 1990, vol. 23, No. 8, 8 pages.

Schütze, H., "Dimensions of Meaning," Proceedings of Supercomputing'92 Conference, Nov. 16-20, 1992, 10 pages.

Sheth B., et al., "Evolving Agents for Personalized Information Filtering," In Proceedings of the Ninth Conference on Artificial Intelligence for Applications, Mar. 1-5, 1993, 9 pages.

Shikano, K., et al., "Speaker Adaptation Through Vector Quantization," IEEE International Conference on Acoustics, Speech, and Signal Processing (ICASSP'86), vol. 11, Apr. 1986, 4 pages.

Sigurdsson, S., et al., "Mel Frequency Cepstral Coefficients: An Evaluation of Robustness of MP3 Encoded Music," In Proceedings of the 7th International Conference on Music Information Retrieval (ISMIR), 2006, 4 pages.

Silverman, K. E. A., et al., "Using a Sigmoid Transformation for Improved Modeling of Phoneme Duration," Proceedings of the IEEE International Conference on Acoustics, Speech, and Signal Processing, Mar. 15-19, 1999, 5 pages.

Tenenbaum, A.M., et al., "Data Structure Using Pascal," 1981 Prentice-Hall, Inc., 34 pages.

Tsai, W.H., et al., "Attributed Grammar-A Tool for Combining Syntactic and Statistical Approaches to Pattern Recognition," IEEE Transactions on Systems, Man, and Cybernetics, vol. SMC-10, No. 12, Dec. 1980, 13 pages.

Udell, J., "Computer Telephony," BYTE, vol. 19, No. 7, Jul. 1, 1994, 9 pages.

van Santen, J. P. H., "Contextual Effects on Vowel Duration," Journal Speech Communication, vol. 11, No. 6, Dec. 1992, 34 pages.

Vepa, J., et al., "New Objective Distance Measures for Spectral Discontinuities in Concatenative Speech Synthesis," In Proceedings of the IEEE 2002 Workshop on Speech Synthesis, 4 pages.

Verschelde, J., "MATLAB Lecture 8. Special Matrices in MATLAB," Nov. 23, 2005, UIC Dept. of Math., Stat.. & C.S., MCS 320, Introduction to Symbolic Computation, 4 pages.

Vingron, M. "Near-Optimal Sequence Alignment," Deutsches Krebsforschungszentrum (DKFZ), Abteilung Theoretische Bioinformatik, Heidelberg, Germany, Jun. 1996, 20 pages.

Werner, S., et al., "Prosodic Aspects of Speech," Université de Lausanne, Switzerland, 1994, Fundamentals of Speech Synthesis and Speech Recognition: Basic Concepts, State of the Art, and Future Challenges, 18 pages.

Wikipedia, "Mel Scale," Wikipedia, the free encyclopedia, http://en.wikipedia.org/wiki/Mel_scale, 2 pages.

Wikipedia, "Minimum Phase," Wikipedia, the free encyclopedia, http://en.wikipedia.org/wiki/Minimum_phase, 8 pages.

Wolff, M., "Poststructuralism and the ARTFUL Database: Some Theoretical Considerations," Information Technology and Libraries, vol. 13, No. 1, Mar. 1994, 10 pages.

Wu, M., "Digital Speech Processing and Coding," ENEE408G Capstone-Multimedia Signal Processing, Spring 2003, Lecture-2 course presentation, University of Maryland, College Park, 8 pages.

Wu, M., "Speech Recognition, Synthesis, and H.C.I.," ENEE408G Capstone-Multimedia Signal Processing, Spring 2003, Lecture-3 course presentation, University of Maryland, College Park, 11 pages.

Wyle, M. F., "A Wide Area Network Information Filter," In Proceedings of First International Conference on Artificial Intelligence on Wall Street, Oct. 9-11, 1991, 6 pages.

Yankelovich, N., et al., "Intermedia: The Concept and the Construction of a Seamless Information Environment," Computer Magazine, Jan. 1988, © 1988 IEEE, 16 pages.

(56) References Cited

OTHER PUBLICATIONS

Yoon, K., et al., "Letter-to-Sound Rules for Korean," Department of Linguistics, The Ohio State University, 2002, 4 pages.
Zhao, Y., "An Acoustic-Phonetic-Based Speaker Adaptation Technique for Improving Speaker-Independent Continuous Speech Recognition," IEEE Transactions on Speech and Audio Processing, vol. 2, No. 3, Jul. 1994, 15 pages.
Zovato, E., et al., "Towards Emotional Speech Synthesis: A Rule Based Approach," 2 pages.
International Search Report dated Nov. 9, 1994, received in International Application No. PCT/US1993/12666, which corresponds to U.S. Appl. No. 07/999,302, 8 pages. (Robert Don Strong).
International Preliminary Examination Report dated Mar. 1, 1995, received in International Application No. PCT/US1993/12666, which corresponds to U.S. Appl. No. 07/999,302, 5 pages. (Robert Don Strong).
International Preliminary Examination Report dated Apr. 10, 1995, received in International Application No. PCT/US1993/12637, which corresponds to U.S. Appl. No. 07/999,354, 7 pages. (Alejandro Acero).
International Search Report dated Feb. 8, 1995, received in International Application No. PCT/US1994/11011, which corresponds to U.S. Appl. No. 08/129,679, 7 pages. (Yen-Lu Chow).
International Preliminary Examination Report dated Feb. 28, 1996, received in International Application No. PCT/US1994/11011, which corresponds to U.S. Appl. No. 08/129,679, 4 pages. (Yen-Lu Chow).
Written Opinion dated Aug. 21, 1995, received in International Application No. PCT/US1994/11011, which corresponds to U.S. Appl. No. 08/129,679, 4 pages. (Yen-Lu Chow).
International Search Report dated Nov. 8, 1995, received in International Application No. PCT/US1995/08369, which corresponds to U.S. Appl. No. 08/271,639, 6 pages. (Peter V. De Souza).
International Preliminary Examination Report dated Oct. 9, 1996, received in International Application No. PCT/US1995/08369, which corresponds to U.S. Appl. No. 08/271,639, 4 pages. (Peter V. De Souza).

* cited by examiner

METHOD AND APPARATUS FOR SEARCHING USING AN ACTIVE ONTOLOGY

CROSS REFERENCE TO RELATED APPLICATIONS

This application claims the benefit of U.S. Provisional Patent Application Ser. No. 61/015,495, filed Dec. 20, 2007, which is herein incorporated by reference in its entirety.

FIELD OF THE INVENTION

The invention relates generally to database searching and relates more specifically to searching using an active ontology.

BACKGROUND OF THE DISCLOSURE

Searching by keywords is well known in the field of database searching. For example, when using an Internet search engine, a user typically enters one or more keywords as a search terms, such that the search results will include database content associated with the keywords. Often, the creator of the content will choose the keywords that will cause the content to be retrieved by a database search (e.g., by "tagging" the content with the keywords). For example, the creator of a review of a fancy Italian restaurant named Restaurant X may tag the review with keywords such as "Italian," "restaurant," and "fancy" such that the review is retrieved when a user enters one or more of those keywords in a query.

A drawback of this approach is that keywords may not capture all of the synonyms that users will use in practice when searching. For example, referring to the example above, the review of Restaurant X might not be retrieved if the user instead enters keywords such as "Italian" and "elegant" or "upscale." These consequences are particularly significant in the field of advertising, where advertisers rely on users viewing their advertisements to generate sales. Moreover, conventional database search systems that search by keywords may have trouble determining the high level intent of what a user is seeking. For example, a search system may be unable to determine that the keywords "Restaurant X," "Friday," and "8:00 PM" indicate that the user wishes to make reservations for Friday at 8:00 PM at Restaurant X.

Thus, there is a need in the art for a method and apparatus for searching using an active ontology.

SUMMARY OF THE INVENTION

Embodiments of the present invention provide a method and apparatus for searching using an active ontology. One embodiment of a method for searching a database includes receiving a search string, where the search string comprises one or more words, generating a semantic representation of the search string in accordance with an ontology, searching the database using the semantic representation, and outputting a result of the searching.

DETAILED DESCRIPTION

In one embodiment, the present invention is a method and apparatus for searching using an active ontology. An "ontology", generally, is a data structure that represents domain knowledge, where distinct classes, attributes, and relations among classes are defined. A separate engine may operate or reason on this data structure to produce certain results. In certain embodiments of the present invention, an ontology is used to select content (e.g., a set of advertisements) from a database given a user query.

The approach to searching that is embodied in the present application may be of particular use in the field of advertising, although the invention is not limited as such. Specifically, the semantic structure employed by embodiments of the present invention allows for improved advertisement indexing. Moreover, the use of links (such as "suggests" and causal links) in the search ontology facilitates the prediction of upcoming relevant content or user actions, and these links can be automatically learned through use.

Figure 1:
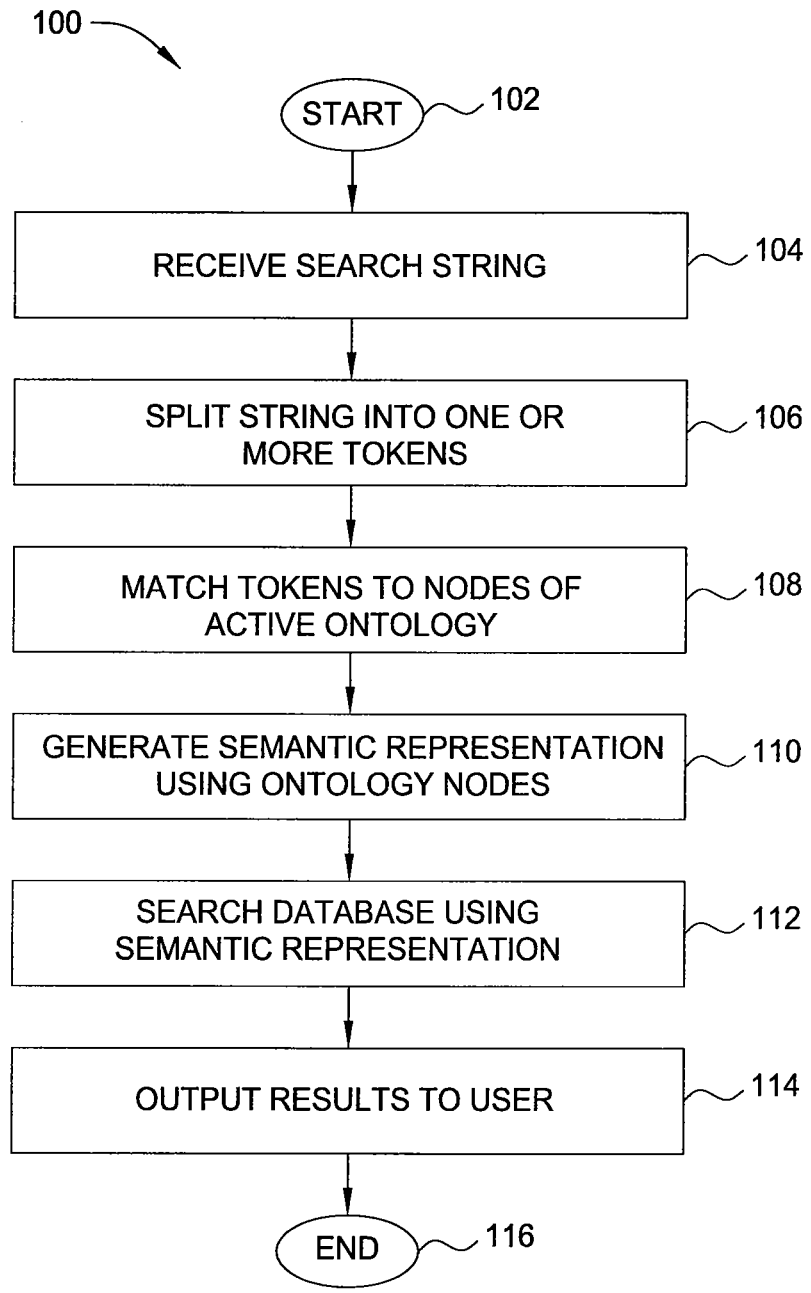
FIG. 1 is a flow diagram illustrating one embodiment of a method for searching using an active ontology, according to the present invention.

FIG. 1 is a flow diagram illustrating one embodiment of a method 100 for searching using an active ontology, according to the present invention. The basic task of the method 100 is to take a user query (i.e., search string) and return a set of relevant content (e.g., advertisements). In one embodiment, the content is sorted by the user's preferences.

The method 100 is initialized at step 102 and proceeds to step 104, where the method 100 receives a search string from a user. In one embodiment, the search string is substantially similar to a search string typically given to an online search engine (e.g., a phrase such as "find fancy Italian food" or "Italian food in San Francisco").

Figure 2:
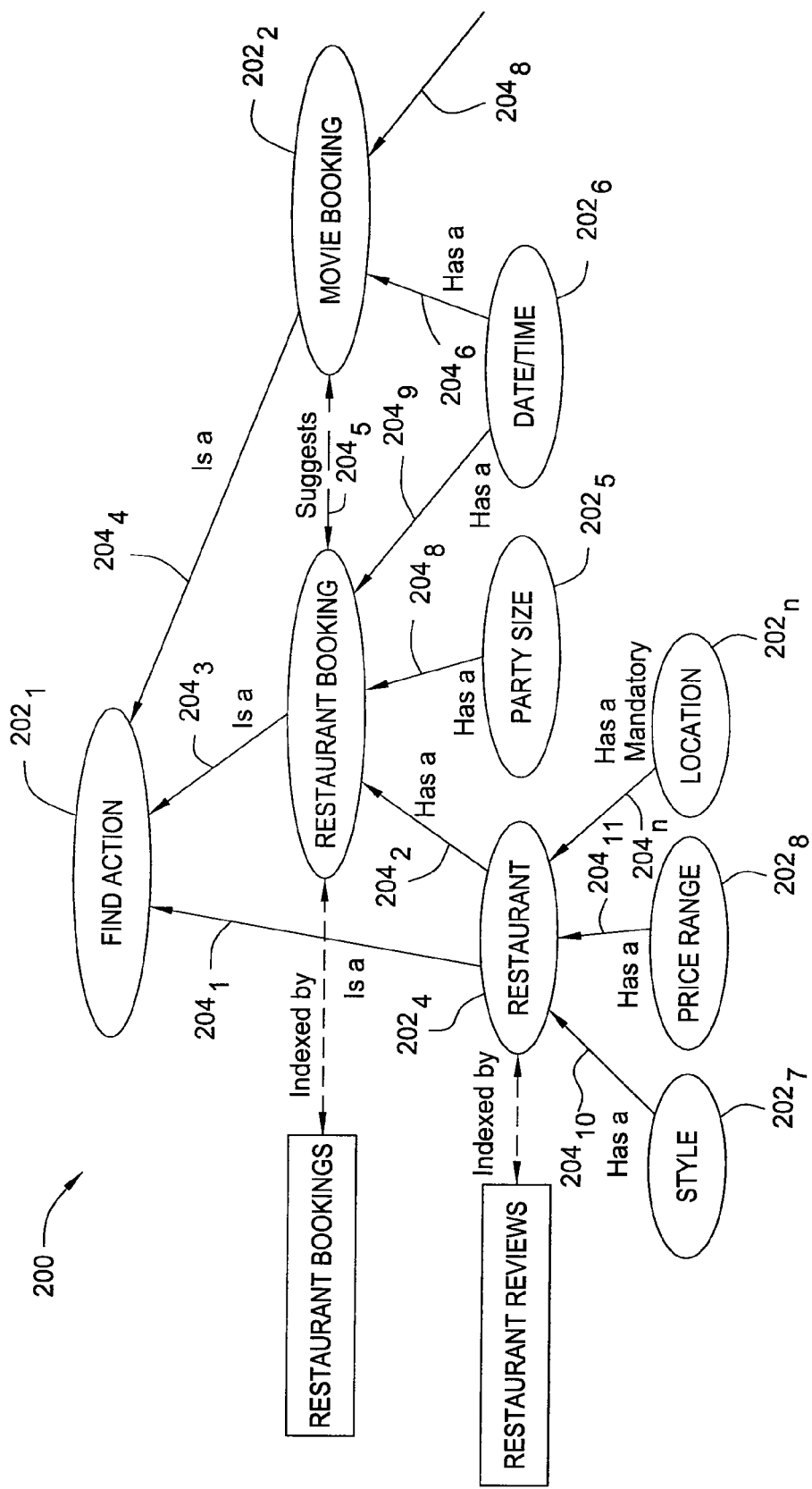
FIG. 2 illustrates one embodiment of an exemplary active ontology that may be used to facilitate a search in accordance with the method illustrated in FIG. 1.

In step 106, the method 100 splits the search string into one or more tokens, each token representing at least one word in the search string. The method 100 then proceeds to step 108 and matches the tokens to nodes of an active ontology. FIG. 2, for example, illustrates one embodiment of an exemplary active ontology 200 that may be used to facilitate a search in accordance with the method 100. As illustrated, the active ontology 200 comprises a plurality of nodes $202_1$-$202_n$ (hereinafter collectively referred to as "nodes 202"). The nodes 202 represent concepts, which may be categories or classes (e.g., as in the case of node $202_4$, which represents the concept or category "Restaurant") or attributes of the classes (e.g., as in the case of nodes $202_7$, $202_8$, and $202_n$, which represent, respectively, the concepts or attributes "Style," "Price Range," and "Location"). The nodes 202 are connected by links $204_1$-$204_n$ (hereinafter collectively referred to as "links 204") which represent the relations among the classes and attributes represented by the nodes 202. For instance, the link $204_{10}$ represents the fact that the class "Restaurant" has an attribute of "Style."

Referring back to FIG. 1, the individual tokens into which the search string is split will activate word matching nodes in the active ontology. In one embodiment, the active ontology is customized for a particular purpose, such as advertising. The method 100 will try to parse the list of tokens, using the active ontology, as a whole phrase, in order to try to determine the overall intent of the user. Thus, the method 100 will try to parse as many of the tokens as possible. This means that if there are multiple ambiguous interpretations of the search string, the method 100 will try to evaluate each weighted alternative based on all of the tokens derived from the search string. The interpretation with the best weight (i.e., the highest confidence) will be used to generate a semantic representation of the search string in step 110.

Specifically, in step 110, the method 100 generates a semantic representation of the search string using the ontology nodes. The ontology nodes corresponding to the best weighted interpretation will create the semantic representation of the phrase. This semantic structure will contain the contextual information that was extracted from the search string. For instance, if the search string was "find fancy Italian food," the method 100 might translate the search string into a semantic structure such as 'find(restaurant, [style("Italian")], [price_range("fancy")])'. This structure captures the user's intent to find a restaurant and it also specifies an additional constraint using a type attribute, restricting the results to those restaurants that are fancy and serve Italian food.

In step 112, the method 100 uses the semantic representation of the search string to search a database (e.g., a database of advertisers). That is, the method 100 searches the database for content that best matches all of the criteria embodied in the semantic representation. In the above example, for instance, a database of advertisements or reviews for restaurants (such as Zagat Survey, LLC's Zagat-.com®) would be searched, restricted to those restaurants that are fancy and serve Italian food. However, if the original or a subsequent search string included the additional constraint of "Friday, 8:00 PM," a semantic representation of this additional constraint might motivate search in a different database, such as a database that allows a user to make restaurant reservations (such as OpenTable, Inc's OpenTable.com®), as illustrated in FIG. 2. The additional constraint of day ("Friday") and time ("8:00 PM") changes the resultant semantic representation in a subtle way that cannot be easily mapped to traditional keyword approaches. As discussed above, the user's original search string may be ambiguous, but the method 100 will parse the search string and translate it to a precise semantic structure that can be used to construct a database query. In this way, the search string is used to search for content based on semantically meaningful attributes and not just based on keywords.

The method 100 outputs the results of the database search to the user in step 114, before terminating in step 116. In one embodiment, the method 100 stores the results in addition to outputting them. In one embodiment, the stored results comprise a record including at least one of: the search string, the semantic representation of the search string, the search results, and a time stamp indicating when the search string was received. The record allows the results to be retrieved by the user at a later time. In addition, the record also allows the method 100 to learn patterns of user behavior that may assist in updating the ontology, as discussed in greater detail below.

In one embodiment, if the search string received in step 104 appears unclear or incomplete (e.g., some of the search criteria are missing), the method 100 examines the user's profile or search history to select default values. For instance, if a first search string was "find fancy Italian restaurants in San Francisco" and a second search string is "get evening showtimes," then the method 100 will remember the location San Francisco, Calif. from the first query when selecting the locations for movie theaters. Also, the user's profile may specify a preference for art movies, so that preference may be added automatically to the second query.

Embodiments of the present invention will therefore parse a user's query and determine the higher level concepts and categories that describe what the user is seeking. These concepts are then used as an index into the database of relevant content. Content that triggers on a particular concept will also be triggered on the subconcepts. For instance, a user query for "Italian restaurants" will automatically trigger ads for "Sicilian restaurants" as well, because "Sicilian" is a subconcept of "Italian." Content providers (e.g., advertisers) only need to register on the highest level category that they wish to match, and they will automatically be triggered for subcategories and their synonyms as well.

Referring back to FIG. 2, as discussed above, links 204 in the active ontology 200 indicate relations among the classes and attributes represented by the nodes 202. Each of these links 204 represents a specific kind of relation. In one embodiment, the types of relations represented by the links 204 in the active ontology 200 include at least one of: an IS-A relation, a HAS-A relation, a CAUSAL relation (such as, for example, a SUGGESTS relation).

For example, in one embodiment, IS-A relations are used to link categories (i.e., concepts in the ontology) to broader categories. In further embodiments, sets of synonyms are defined for concepts. In this way, the search string can be translated into a semantic search for content based on broader categories like "European restaurants" or "fancy restaurants" or "expensive food".

In a further embodiment, HAS-A relations are used to specify additional search criteria that will be associated with a concept or category. For instance, when searching for a restaurant, a city location may be a mandatory search parameter, as illustrated in FIG. 2. This is specified using a mandatory HAS-A link (link $204_n$) in the ontology 200 from the RESTAURANT concept node (node $202_4$) to the LOCATION node (node $202_n$). A price range is also a useful search parameter, but may be optional. Thus, a HAS-A link (link $204_{11}$) from the RESTAURANT concept node (node $202_4$) to the PRICE RANGE concept node (node $202_8$) may be established and marked as optional. The concepts that have HAS-A links become GATHER type nodes. When the user's search string is parsed, the semantic slots for these HAS-A links are filled in using the parsed tokens, or else default values are used from the user's profile and search history. Therefore, the present invention has this detailed information available when searching a database.

In further embodiments, the concepts of the present invention are used to model basic processes. In one embodiment, the ontology includes CAUSAL links or SUGGESTS links between concepts. CAUSAL links would be used if one concept directly causes another concept, or if one action usually precedes another action. SUGGESTS links are especially useful and would link user actions that often occur together but not in a particular order. For example, the concept nodes for RESTAURANT BOOKING (node $202_3$) and MOVIE BOOKING (node $202_2$) could be linked bidirectionally with a SUGGESTS link (link $204_5$), as illustrated in FIG. 2. An ATM concept node (not shown), which represents a user visit to an automated teller machine (ATM), could be linked with a CAUSAL node to both RESTAURANT BOOKING (node $202_3$) and MOVIE BOOKING (node $202_2$) because a visit to an ATM often precedes dinner and a movie closely in time.

In further embodiments, a system according to the present invention utilizes the process model to help determine what else might interest a given user. For example, given a search string "find restaurants," the present invention would activate the RESTAURANT concept node (node $202_4$) and indirectly activate the RESTAURANT BOOKING (node $202_3$) and MOVIE (node $202_2$) concept nodes as well. If the search string was received during evening hours, then the RESTAURANT BOOKING node (node $202_3$) would have higher confidence. This in turn would increase activation of SUGGESTS-linked nodes (e.g., the MOVIE node $202_2$). Therefore, the system would query its database for restaurants and could also produce additional results for nearby movies. Each of the search results would be associated with the concepts that triggered them, so that the results for MOVIES could be presented separately to the user. Although this scenario utilizes a process model that is explicitly encoded into an ontology, those skilled in the art will appreciate that some of the links could be learned using data mining techniques from the logs of a particular user or the aggregated behavior of many users.

Over time, users of the present invention may ask for movies, restaurants, ATMs, gas stations, book stores, or the like. In one embodiment, the inventive system logs the corresponding semantic structures for each of the received search strings and the time stamps indicating when the search strings were received. These logs can be scanned in temporal order, and all of the search strings that happen within various time windows can be analyzed to make co-occurrence counts. By counting and ranking those pairs of events that co-occur over different time scales, patterns of behavior would emerge over a large body of users. For example, the logs may show many occurrences of MOVIE and RESTAURANT queries that happen within four hours of each other. If so, then the ontology could be automatically augmented with a SUGGESTS link between those nodes. In addition, ATM may also co-occur frequently with both MOVIE and RESTAURANT, but ATM should precede MOVIE and RESTAURANT in time with high probability. If so, then two CAUSAL links could be added from ATM to RESTAURANT and MOVIE. In this way, statistics could be collected for a particular user or for many users in aggregate. The system would offer related search results based on how frequently a related concept co-occurs with the user's current search string.

Figure 3:
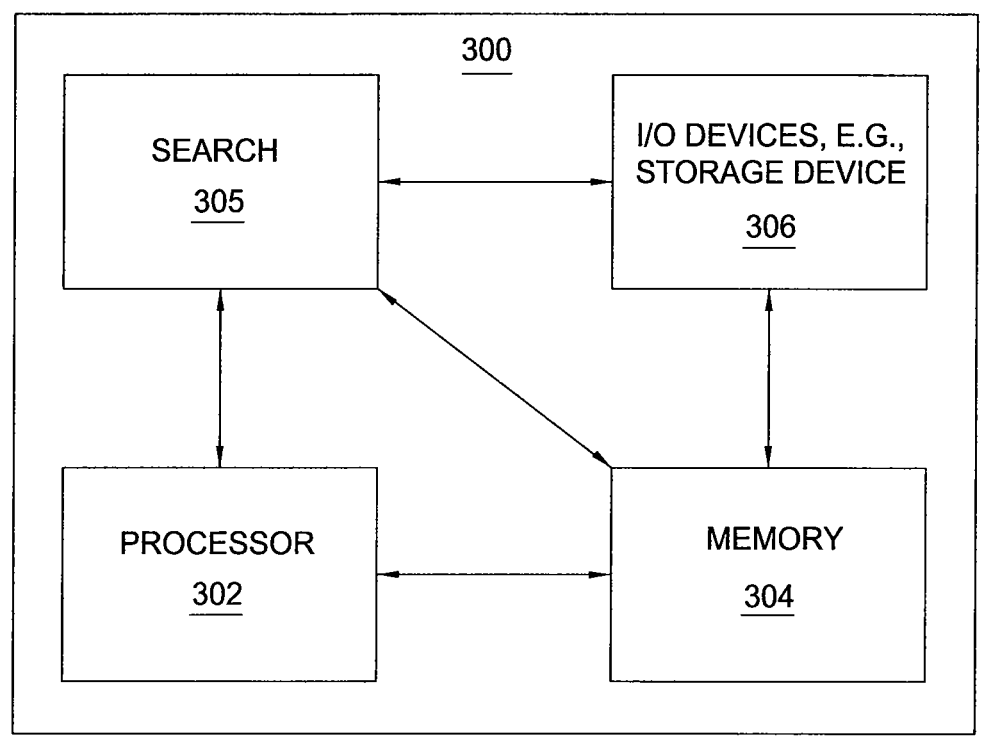
FIG. 3 is a high level block diagram of the present search method that is implemented using a general purpose computing device.

FIG. 3 is a high level block diagram of the present search method that is implemented using a general purpose computing device 300. In one embodiment, a general purpose computing device 300 comprises a processor 302, a memory 304, a search module 305 and various input/output (I/O) devices 306 such as a display, a keyboard, a mouse, a modem, and the like. In one embodiment, at least one I/O device is a storage device (e.g., a disk drive, an optical disk drive, a floppy disk drive). It should be understood that the search module 305 can be implemented as a physical device or subsystem that is coupled to a processor through a communication channel.

Alternatively, the search module 305 can be represented by one or more software applications (or even a combination of software and hardware, e.g., using Application Specific Integrated Circuits (ASIC)), where the software is loaded from a storage medium (e.g., I/O devices 306) and operated by the processor 302 in the memory 304 of the general purpose computing device 300. Thus, in one embodiment, the search module 305 for database searching described herein with reference to the preceding Figures can be stored on a computer readable medium or carrier (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

While foregoing is directed to the preferred embodiment of the present invention, other and further embodiments of the invention may be devised without departing from the basic scope thereof.

What is claimed is:

1. A method for constructing database queries for searching at least one database, comprising:
   receiving a user entered search string, the search string comprising one or more words;
   identifying a first node in an ontology based on the one or more words of the search string, the first node being related to at least one of the one or more words in the search string, wherein the ontology includes at least one node representing a concept and at least one node representing an attribute of the concept;
   constructing a first database query based on the identified first node in the ontology, the first database query comprising one or more attributes associated with the first node, and a respective value, from the search string, for each of the one or more attributes;
   after constructing the first database query, searching at least one database using the first database query;
   identifying, based on a frequency of occurrence of a pair of user events, a second node in the ontology, the second node associated with the first node, the second node representing a concept not represented by the received search string, wherein a first user event of the pair of user events corresponds to the first node and a second user event of the pair of user events corresponds to the second node, and wherein for each occurrence of the pair of user events, the first user event and the second user event occur within a predetermined time period;
   constructing a second database query based on the identified second node;
   after constructing the second database query, searching at least one database using the second database query; and
   outputting results of the searching.

2. The method of claim 1, wherein identifying the first node in an ontology comprises:
   splitting the search string into one or more tokens, where each of the one or more tokens represents at least one of the one or more words;
   parsing the one or more tokens, using the ontology; and
   producing an interpretation of the search string as a result of the parsing.

3. The method of claim 2, wherein parsing the one or more tokens comprises:
   matching the one or more tokens to at least one node in the ontology.

4. The method of claim 2, wherein producing an interpretation of the search string comprises:
   producing a plurality of interpretations of the search string;

assigning a weight to each of the plurality of interpretations, the weight indicating a confidence that an associated one of the plurality of interpretations is correct; and selecting a one of the plurality of interpretations with a highest weight.

5. The method of claim 1, further comprising:
identifying one or more missing search criteria in the search string; and
selecting a default value for the one or more missing search criteria from at least one of: a user profile and a user search history.

6. The method of claim 5, wherein the first database query further comprises an additional attribute having an additional value, wherein the additional value is the selected default value.

7. The method of claim 1, wherein the ontology further comprises:
a plurality of links connecting nodes of the ontology with one another, each of the plurality of links representing a relation between nodes linked thereby.

8. The method of claim 7, wherein at least one relation among nodes comprises an indication that one concept causes another concept.

9. The method of claim 7, wherein at least one relation among nodes comprises an indication that concepts represented by the nodes tend to occur together.

10. The method of claim 7, wherein at least one relation among nodes comprises an indication that one of the nodes represents at least one additional search criterion associated with a concept represented by another of the nodes.

11. The method of claim 1, wherein the ontology is customized for a particular purpose.

12. The method of claim 1, further comprising:
augmenting at least one of the first and second database queries by incorporating at least one additional attribute associated with at least one additional node linked to the identified first node.

13. The method of claim 1, wherein the second database query comprises:
at least one attribute associated with the first node; and
a value, from the search string, of the at least one attribute.

14. The method of claim 1, wherein the identified first node corresponds to a best weighted interpretation of user intent.

15. The method of claim 1, further comprising establishing at least one link between nodes based on observed behavior of at least one user.

16. The method of claim 15, wherein establishing the at least one link between nodes comprises establishing a link between two nodes responsive to a degree of observed co-occurrence of identification of the two nodes in response to receiving user queries.

17. The method of claim 1, wherein the ontology comprises an active ontology.

18. The method of claim 1, further comprising:
generating a log of nodes identified as being related to a plurality of search strings received over a period of time;
determining co-occurrences among the logged nodes; and
augmenting the ontology to include links among nodes based on frequency of the determined co-occurrences.

19. The method of claim 18, wherein generating a log comprises:
for each of a plurality of received search strings, storing a record comprising at least one of: the search string, the identified node, the result, and a time stamp indicating a reception time of the search string.

20. The method of claim 1, wherein the second node is associated with the first node based on a link between the first node and the second node.

21. The method of claim 1, wherein the second node represents a concept not represented by the received search string, and wherein the second node is a concept node that does not match any of the words in the search string.

22. The method of claim 1, wherein the first node and the second node are identified at substantially the same time.

23. The method of claim 1, wherein the first node and the second node are identified prior to searching any database with either the first database query or the second database query.

24. The method of claim 1, further comprising:
selecting at least a first database from a plurality of databases in accordance with a constraint defined in the first database query, wherein searching at least one database using the first database query comprises searching the selected at least a first database using the first database query.

25. The method of claim 1, wherein:
searching at least one database using the first database query comprises searching a first database using the first database query to retrieve first results that satisfy one or more criteria defined in the first database query;
searching at least one database using the second database query comprises searching a second database using the second database query to retrieve second results that satisfy one or more criteria defined in the second database query, the second database is different from the first database; and
outputting results comprises outputting results based on the first result and the second results.

26. The method of claim 1, wherein:
the first node in the ontology represents a first user intent of performing a first action;
the second node in the ontology represents a second user intent of performing a second action; and
the first node and the second node are directly connected by a link in the ontology, the link representing a causal relationship between the first action and the second action.

27. The method of claim 1, wherein a keyword search with words from the user entered search string is not performed on the at least one database after receiving the user entered search string and prior to searching the at least one database using the first database query.

28. The method of claim 1, wherein the first database query represents a user intent for the user entered search string.

29. A non-transitory computer readable storage medium containing an executable program for constructing database queries for searching a database, wherein the program is configured to cause at least one processor to perform the steps of:
receiving a user entered search string, the search string comprising one or more words;
identifying a first node in an ontology based on the one or more words of the search string, the first node being related to at least one of the one or more words in the search string, wherein the ontology includes at least one node representing a concept and at least one node representing an attribute of the concept;
constructing a first database query based on the identified first node in the ontology, the first database query comprising one or more attributes associated with the first node, and a respective value, from the search string, for each of the one or more attributes;

after constructing the first database query, searching at least one database using the first database query;

identifying, based on a frequency of occurrence of a pair of user events, a second node in the ontology, the second node associated with the first node, the second additional node representing a concept not represented by the received search string, wherein a first user event of the pair of user events corresponds to the first node and a second user event of the pair of user events corresponds to the second node, and wherein for each occurrence of the pair of user events, the first user event and the second user event occur within a predetermined time period;

constructing a second database query based on the identified second;

after constructing the second database query, searching at least one database using the second database query; and outputting results of the searching.

30. The computer readable storage medium of claim 29, wherein identifying the first node in an ontology comprises:
   splitting the search string into one or more tokens, where each of the one or more tokens represents at least one of the one or more words;
   parsing the one or more tokens, using the ontology; and
   producing an interpretation of the search string as a result of the parsing.

31. The computer readable storage medium of claim 30, wherein parsing the one or more tokens comprises:
   matching the one or more tokens to at least one node in the ontology.

32. The computer readable storage medium of claim 30, wherein producing an interpretation of the search string comprises:
   producing a plurality of interpretations of the search string;
   assigning a weight to each of the plurality of interpretations, the weight indicating a confidence that an associated one of the plurality of interpretations is correct; and
   selecting a one of the plurality of interpretations with a highest weight.

33. The computer readable storage medium of claim 29, wherein the program is further configured to cause the at least one processor to perform the steps of:
   identifying one or more missing search criteria in the search string; and
   selecting a default value for the one or more missing search criteria from at least one of: a user profile and a user search history.

34. The computer readable storage medium of claim 33, wherein the first database query further comprises an additional attribute having an additional value, wherein the additional value is the selected default value.

35. The computer readable storage medium of claim 29, wherein the ontology further comprises:
   a plurality of links connecting nodes of the ontology with one another, each of the plurality of links representing a relation between nodes linked thereby.

36. The computer readable storage medium of claim 35, wherein the relation among nodes comprises an indication that one concept causes another concept.

37. The computer readable storage medium of claim 35, wherein at least one relation among nodes comprises an indication that concepts represented by the nodes tend to occur together.

38. The computer readable storage medium of claim 35, wherein at least one relation among nodes comprises an indication that one of the nodes represents at least one additional search criterion associated with a concept represented by another of the nodes.

39. The computer readable storage medium of claim 29, wherein the ontology is customized for a particular purpose.

40. The computer readable storage medium of claim 29, wherein the program is further configured to cause at least one processor to perform the step of:
   augmenting the constructed database query by incorporating at least one additional attribute associated with at least one additional node linked to the identified first node.

41. The computer readable storage medium of claim 29, wherein the second database query comprises:
   at least one attribute associated with the first node; and
   a value, from the search string, of the at least one attribute.

42. The computer readable storage medium of claim 29, wherein the identified first node corresponds to a best weighted interpretation of user intent.

43. The computer readable storage medium of claim 29, wherein the program is further configured to cause at least one processor to perform the step of:
   establishing at least one link between nodes based on observed behavior of at least one user.

44. The computer readable storage medium of claim 43, wherein establishing the at least one link between nodes comprises establishing a link between two nodes responsive to a degree of observed co-occurrence of identification of the two nodes in response to receiving user queries.

45. The computer readable storage medium of claim 29, wherein the ontology comprises an active ontology.

46. The computer readable storage medium of claim 29, wherein the program is further configured to cause at least one processor to perform the steps of:
   generating a log of nodes identified as being related to a plurality of search strings received over a period of time;
   determining co-occurrences among the logged nodes; and
   augmenting the ontology to include links among nodes based on frequency of the determined co-occurrences.

47. The computer readable storage medium of claim 46, wherein generating a log comprises:
   for each of a plurality of received search strings, storing a record comprising at least one of: the search string, the identified node, the result, and a time stamp indicating a reception time of the search string.

48. The computer readable storage medium of claim 29, wherein the second node is associated with the first node based on a link between the first node and the second node.

49. The computer readable storage medium of claim 29, wherein the second node represents a concept not represented by the received search string, and wherein the second node is a concept node that does not match any of the words in the search string.

50. The computer readable storage medium of claim 29, wherein the first node and the second node are identified at substantially the same time.

51. The computer readable storage medium of claim 29, wherein the first node and the second node are identified prior to searching any database with either the first database query or the second database query.

52. The computer readable storage medium of claim 29, wherein the program is further configured to cause the at least one processor to perform the step of:
  selecting at least a first database from a plurality of databases in accordance with a constraint defined in the first database query, wherein searching at least one database using the first database query comprises searching the selected at least a first database using the first database query.

53. The computer readable storage medium of claim 29, wherein:
  searching at least one database using the first database query comprises searching a first database using the first database query to retrieve first results that satisfy one or more criteria defined in the first database query;
  searching at least one database using the second database query comprises searching a second database using the second database query to retrieve second results that satisfy one or more criteria defined in the second database query, the second database is different from the first database; and
  outputting results comprises outputting results based on the first result and the second results.

54. The computer readable storage medium of claim 29, wherein:
  the first node in the ontology represents a first user intent of performing a first action;
  the second node in the ontology represents a second user intent of performing a second action; and
  the first node and the second node are directly connected by a link in the ontology, the link representing a causal relationship between the first action and the second action.

55. The computer readable storage medium of claim 29, wherein a keyword search with words from the user entered search string is not performed on the at least one database after receiving the user entered search string and prior to searching the at least one database using the first database query.

56. The computer readable storage medium of claim 29, wherein the first database query represents a user intent for the user entered search string.

57. A system for constructing a database query for searching at least one database, comprising:
  an input device configured to receive a user entered search string, the search string comprising one or more words;
  a processor, communicatively coupled to the input device, configured to perform the steps of:
  identifying a first node in an ontology based on the one or more words of the search string, the first node being related to at least one of the one or more words in the search string, wherein the ontology includes at least one node representing a concept and at least one node representing an attribute of the concept;
  constructing a first database query based on the identified first node in the ontology, the first database query one or more attributes associated with the first node, and a respective value, from the search string, for each of the one or more attributes;
  identifying, based on a frequency of occurrence of a pair of user events, a second node in the ontology, the second node associated with the first node, the second node representing a concept not represented by the received search string, wherein a first user event of the pair of user events corresponds to the first node and a second user event of the pair of user events corresponds to the second node, and wherein for each occurrence of the pair of user events, the first user event and the second user event occur within a predetermined time period; and
  constructing a second database query based on the identified second node representing a concept not represented by the received search string;
  a search module, communicatively coupled to the processor, configured to perform the steps of:
  after the first database query has been constructed, searching at least one database using the first database query; and
  after the second database query has been constructed, searching at least one database using the second database query; and
  an output device, communicatively coupled to the search module, configured to output results of the searching.

58. The system of claim 57, wherein the processor is configured to identify the first node in an ontology by:
  splitting the search string into one or more tokens, where each of the one or more tokens represents at least one of the one or more words;
  parsing the one or more tokens, using the ontology; and
  producing an interpretation of the search string as a result of the parsing.

59. The system of claim 57, wherein the second database query comprises:
  at least one attribute associated with the first node; and
  a value, from the search string, of the at least one attribute.

60. The system of claim 57, wherein the processor is further configured to perform the steps of:
  generating a log of nodes identified as being related to a plurality of search strings received over a period of time;
  determining co-occurrences among the logged nodes; and
  augmenting the ontology to include links among nodes based on frequency of the determined co-occurrences.

61. The system of claim 60, wherein at least one relation among nodes comprises an indication that concepts represented by the nodes tend to occur together.

62. The system of claim 60, wherein at least one relation among nodes comprises an indication that one of the nodes represents at least one additional search criterion associated with a concept represented by another of the nodes.

63. The system of claim 57, wherein the second node is associated with the first node based on a link between the first node and the second node.

64. The system of claim 57, wherein the second node represents a concept not represented by the received search string, and wherein the second node is a concept node that does not match any of the words in the search string.

65. The system of claim 57, wherein the first node and the second node are identified at substantially the same time.

66. The system of claim 57, wherein the first node and the second node are identified prior to searching any database with either the first database query or the second database query.

67. The system of claim 57, wherein the processor is further configured to perform the step of:
  selecting at least a first database from a plurality of databases in accordance with a constraint defined in the first database query, wherein searching at least one database using the first database query comprises searching the selected at least a first database using the first database query.

68. The system of claim 57, wherein:
  searching at least one database using the first database query comprises searching a first database using the first database query to retrieve first results that satisfy one or more criteria defined in the first database query;

searching at least one database using the second database query comprises searching a second database using the second database query to retrieve second results that satisfy one or more criteria defined in the second database query, the second database is different from the first database; and outputting results comprises outputting results based on the first result and the second results.

69. The system of claim 57, wherein:

the first node in the ontology represents a first user intent of performing a first action;

the second node in the ontology represents a second user intent of performing a second action; and the first node and the second node are directly connected by a link in the ontology, the link representing a causal relationship between the first action and the second action.

70. The system of claim 57, wherein a keyword search with words from the user entered search string is not performed on the at least one database after receiving the user entered search string and prior to searching the at least one database using the first database query.

71. The system of claim 57, wherein the first database query represents a user intent for the user entered search string.

* * * * *